US012627999B2

(12) United States Patent
Wu et al.

(10) Patent No.: US 12,627,999 B2
(45) Date of Patent: May 12, 2026

(54) CELL MEASUREMENT METHOD AMD COMMUNICATIONS APPARATUS

(71) Applicant: HUAWEI TECHNOLOGIES CO., LTD., Shenzhen (CN)

(72) Inventors: Yedan Wu, Shanghai (CN); Tingting Geng, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 656 days.

(21) Appl. No.: 17/975,862

(22) Filed: Oct. 28, 2022

(65) Prior Publication Data

US 2023/0049063 A1 Feb. 16, 2023

Related U.S. Application Data

(63) Continuation of application No. PCT/CN2021/091343, filed on Apr. 30, 2021.

(30) Foreign Application Priority Data

Apr. 30, 2020 (CN) .......................... 202010367143.1

(51) Int. Cl.
*H04W 16/26* (2009.01)
*H04B 7/185* (2006.01)
*H04W 64/00* (2009.01)

(52) U.S. Cl.
CPC ........ *H04W 16/26* (2013.01); *H04B 7/18519* (2013.01); *H04W 64/00* (2013.01)

(58) Field of Classification Search
CPC ... H04W 16/26; H04W 64/00; H04B 7/18519
See application file for complete search history.

(56) References Cited

U.S. PATENT DOCUMENTS

2013/0308481 A1 11/2013 Kazmi et al.
2014/0022120 A1 1/2014 Mendelsohn et al.
(Continued)

FOREIGN PATENT DOCUMENTS

CN 102131207 A 7/2011
CN 108738034 A 11/2018
(Continued)

OTHER PUBLICATIONS

Nokia et al., "Discussion on fixed vs. steerable beams in NTN LEO", 3GPP TSG-RAN WG2 Meeting #107bis, R2-1913923, Chongqing, China, Oct. 14-18, 2019, 12 pages.
(Continued)

*Primary Examiner* — Jackie Zuniga Abad
(74) *Attorney, Agent, or Firm* — Maier & Maier, PLLC

(57) ABSTRACT

A communication method and an apparatus. The method includes: a terminal device receives measurement configuration information from a first network device, where the measurement configuration information indicates the terminal device to measure a first cell. The terminal device sends a measurement result to a second network device, where the measurement result is obtained by the terminal device by measuring the first cell based on the measurement configuration information, and the measurement result indicates that the terminal device obtains a signal of the first cell through measurement or does not obtain a signal of the first cell through measurement. Based on the indication, of the measurement result, that the terminal device obtains the signal of the first cell through measurement or does not obtain the signal of the first cell through measurement, whether coverage of the first cell needs to be corrected may be further determined.

20 Claims, 11 Drawing Sheets

Earth fixed cell
Earth Fixed Cells

Maximum antenna elevation angle
Max elevation angle

Minimum antenna elevation angle
Min elevation angle

Minimum antenna elevation angle
Min elevation angle

(56) References Cited

U.S. PATENT DOCUMENTS

| | | | |
|---|---|---|---|
| 2015/0201347 A1 | 7/2015 | Kim et al. | |
| 2019/0320372 A1 | 10/2019 | Zhang et al. | |
| 2020/0145843 A1* | 5/2020 | Yang ................... | H04W 24/02 |
| 2020/0359247 A1* | 11/2020 | Yi ........................ | H04W 80/02 |
| 2021/0083760 A1* | 3/2021 | Schmidt ............ | H04W 36/0058 |
| 2022/0225150 A1* | 7/2022 | Zheng .................. | H04W 24/08 |

FOREIGN PATENT DOCUMENTS

| | | |
|---|---|---|
| CN | 111010708 A | 4/2020 |
| WO | 2019052168 A1 | 3/2019 |
| WO | 2019170866 A1 | 9/2019 |
| WO | 2019170867 A1 | 9/2019 |

OTHER PUBLICATIONS

3GPP, "3rd Generation Partnership Project; Technical Specification Group Radio Access Network; NR; Physical layer measurements (Release 16)", 3GPP TS 38.215 V16.1.0, Mar. 2020, 22 pages.

3GPP, "3rd Generation Partnership Project; Technical Specification Group Radio Access Network; NR; Requirements for support of radio resource management (Release 16)", 3GPP TS 38.133 V16.3.0, Mar. 2020, 1169 pages.

3GPP, "3rd Generation Partnership Project; Technical Specification Group Radio Access Network; NR; Radio Resource Control (RRC) protocol specification (Release 16)", 3GPP TS 38.331 V16.0.0, Mar. 2020, 835 pages.

3GPP, "3rd Generation Partnership Project; Technical Specification Group Radio Access Network; NR; NR and NG-RAN Overall Description; Stage 2 (Release 16)", 3GPP TS 38.300 V16.1.0, Mar. 2020, 133 pages.

3GPP, "3rd Generation Partnership Project; Technical Specification Group Radio Access Network; Evolved Universal Terrestrial Radio Access Network(E-UTRAN); S1 Application Protocol (S1AP) (Release 16)", 3GPP TS 36.413 V16.1.0, Mar. 2020, 391 pages.

3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 16)", 3GPP TS 36.300 V16.1.0, Mar. 2020, 386 pages.

3GPP, "3rd Generation Partnership Project; Technical Specification Group Radio Access Network; Study on RAN-centric data collection and utilization for LTE and NR (Release 16)", 3GPP TR 37.816 V16.0.0, Jul. 2019, 35 pages.

3GPP, "3rd Generation Partnership Project; Technical Specification Group Radio Access Network; Solutions for NR to support non-terrestrial networks (NTN) (Release 16)", 3GPP TR 38.821 V16.0.0, Dec. 2019, 140 pages.

* cited by examiner

CELL MEASUREMENT METHOD AMD COMMUNICATIONS APPARATUS

CROSS-REFERENCE TO RELATED APPLICATIONS

This application is a continuation of International Application No. PCT/CN2021/091343, filed on Apr. 30, 2021, which claims priority to Chinese Patent Application No. 202010367143.1, filed on Apr. 30, 2020. The disclosures of the aforementioned applications are hereby incorporated by reference in their entireties.

TECHNICAL FIELD

The embodiments relate to the field of communication technologies, a communication method, and an apparatus.

BACKGROUND

In satellite communication, coverage of a cell is generally large. For example, a cell diameter ranges from 50 km to 1,000 km. Because a satellite is far away from the earth, an antenna direction angle of the satellite is very important. Slight deviation causes a location of a cell projected to the ground to deviate by tens of kilometers to hundreds of kilometers. Therefore, it is very important to ensure that the antenna direction angle of the satellite does not deviate.

An orbit altitude of a low-earth orbit (LEO) satellite is 160 km to 2,000 km. The LEO satellite flies around the earth at a high speed of nearly 7 km/s. Cells projected by the LEO satellite to the ground include two modes: a moving cell and a fixed cell.

The moving cell means that the cell projected by the LEO satellite to the ground moves with the satellite. Generally, when an antenna of the LEO satellite is perpendicular to the ground, the cell projected by the LEO satellite to the ground is a moving cell. Regardless of whether the LEO satellite is used as an independent base station or a relay base station, the moving cell moves along with the LEO satellite, and a relative distance between the LEO satellite and a terminal device keeps changing. After a period of time, a signal of the LEO satellite may not be capable of covering the terminal device. If network deployment is relatively complete, there is a next LEO satellite to cover the terminal device. Because a satellite system is spherical, the next LEO satellite may come from various angles.

The fixed cell means that the cell projected by the LEO satellite to the ground is stationary relative to the ground. Different LEO satellites adjust antenna direction angles to cover a same area on the ground. As shown in FIG. 1, when a LEO satellite cannot cover the area, another LEO satellite instead covers the area.

Consequently, in cells in the foregoing two modes, once the antenna direction angle of the satellite deviates, severe cell deviation occurs. Especially in a scenario in which a LEO cell is a fixed cell, an antenna direction angle of a satellite is continuously changed to ensure that coverage of the cell projected to the ground remains unchanged. This is difficult to implement and is easy to cause errors.

SUMMARY

The embodiments may provide a communication method and an apparatus, to correct an error in cell coverage.

According to a first aspect, an embodiment may provide a communication method. The method may be performed by a terminal device or may be performed by a chip having a function of the terminal device. This is not limited herein. The method includes: receiving measurement configuration information from a first network device, where the measurement configuration information indicates the terminal device to measure a first cell; and sending a measurement result to a second network device, where the measurement result is obtained by the terminal device by measuring the first cell based on the measurement configuration information, and the measurement result indicates that the terminal device obtains a signal of the first cell through measurement or does not obtain a signal of the first cell through measurement.

According to the foregoing method, the terminal device is configured to measure the first cell. Based on the indication, of the measurement result, that the terminal device obtains the signal of the first cell through measurement or does not obtain the signal of the first cell through measurement, whether coverage of the first cell needs to be corrected may be further determined. Therefore, the foregoing method may be used effectively for correcting an error in cell coverage, and the method has low costs, and may be further applied to a scenario in which a self-correction mechanism of a satellite fails.

The measurement configuration information may further indicate the terminal device to report a signal elevation angle of the first cell, and the measurement result further includes the signal elevation angle of the first cell.

The measurement configuration information may indicate the terminal device to report the signal elevation angle of the first cell, and whether an antenna direction angle corresponding to the first cell needs to be adjusted may be determined based on the signal elevation angle of the first cell in the measurement result.

The measurement configuration information may further indicate the terminal device to report location information of the terminal device, and the measurement result further includes the location information of the terminal device.

The measurement configuration information may indicate the terminal device to report the location information of the terminal device, and whether the antenna direction angle corresponding to the first cell needs to be adjusted, and/or whether a flight path of a network device covering the first cell needs to be adjusted or whether a flight path of a network device used to forward the signal of the first cell needs to be adjusted may be determined based on the location information of the terminal device in the measurement result and other information in the measurement result.

The measurement configuration information may further indicate time at which the terminal device measures the first cell, and the measurement result further includes information about the time at which the terminal device measures the first cell.

The measurement configuration information may indicate the time at which the terminal device measures the first cell, and whether the antenna direction angle corresponding to the first cell needs to be adjusted, and/or whether the flight path of the network device covering the first cell needs to be adjusted or whether the flight path of the network device used to forward the signal of the first cell needs to be adjusted may be determined based on the information about the time at which the terminal device measures the first cell in the measurement result and other information in the measurement result.

The method may further include: sending capability information of the terminal device to the first network device, where the capability information of the terminal device includes at least one of a cell that the terminal device can measure, a measurement frequency band on which the terminal device can perform measurement, or a signal elevation angle measurement error corresponding to the measurement frequency band on which the terminal device can perform measurement.

The terminal device may report the capability information of the terminal device to the first network device, and the first network device may configure the measurement configuration information for the terminal device based on the capability information of the terminal device, for example, configure a cell to be measured for the terminal device based on the capability information of the terminal device.

The first cell may be a serving cell of the terminal device or a neighboring cell of the serving cell of the terminal device. The terminal device may measure the serving cell of the terminal device or the neighboring cell of the serving cell of the terminal device.

The first cell may alternatively be a satellite cell. The terminal device may measure the satellite cell.

The measurement configuration information may include an identifier of the first cell and the identifier may include at least one of a CGI, a PCI, a frequency, a network device identifier, or a satellite type of a cell.

The identifier of the first cell may be in a plurality of forms.

According to a second aspect, an embodiment may provide a communication method. The method may be performed by a network device or may be performed by a chip having a function of the network device. This is not limited herein. The method includes: determining measurement configuration information, where the measurement configuration information indicates a terminal device to measure a first cell and report that the terminal device obtains a signal of the first cell through measurement or the terminal device does not obtain a signal of the first cell through measurement; and sending the measurement configuration information to the terminal device.

According to the foregoing method, the terminal device is configured to measure the first cell and report that the terminal device obtains the signal of the first cell through measurement or the terminal device does not obtain the signal of the first cell through measurement, so that whether coverage of the first cell needs to be corrected can be determined based on that the terminal device obtains the signal of the first cell through measurement or the terminal device does not obtain the signal of the first cell through measurement. Therefore, the foregoing method may be used effectively for correcting an error in cell coverage, and the method has low costs, and may be further applied to a scenario in which a self-correction mechanism of a satellite fails.

The measurement configuration information may further indicate the terminal device to report a signal elevation angle of the first cell.

The measurement configuration information may indicate the terminal device to report the signal elevation angle of the first cell, and whether an antenna direction angle corresponding to the first cell needs to be adjusted may be determined based on the signal elevation angle of the first cell.

The measurement configuration information may further indicate the terminal device to report location information of the terminal device.

The measurement configuration information may indicate the terminal device to report the location information of the terminal device, and whether the antenna direction angle corresponding to the first cell needs to be adjusted, and/or whether a flight path of a network device covering the first cell needs to be adjusted or whether a flight path of a network device used to forward the signal of the first cell needs to be adjusted are/is determined based on the location information of the terminal device and other reporting information.

The measurement configuration information may further indicate time at which the terminal device measures the first cell.

The measurement configuration information may indicate the time at which the terminal device measures the first cell, and whether the antenna direction angle corresponding to the first cell needs to be adjusted, and/or whether the flight path of the network device covering the first cell needs to be adjusted or whether the flight path of the network device used to forward the signal of the first cell needs to be adjusted are/is determined based on information about the time at which the terminal device measures the first cell and other reporting information.

The method may further include: receiving capability information of the terminal device from the terminal device, where the capability information of the terminal device includes at least one of a cell that the terminal device can measure, a measurement frequency band on which the terminal device can perform measurement, or a signal elevation angle measurement error corresponding to the measurement frequency band on which the terminal device can perform measurement.

The terminal device may report the capability information of the terminal device to a first network device, and the first network device may configure the measurement configuration information for the terminal device based on the capability information of the terminal device, for example, configure a cell to be measured for the terminal device based on the capability information of the terminal device.

The first cell may be a serving cell of the terminal device or a neighboring cell of the serving cell of the terminal device.

The measurement configuration information may indicate the terminal device to measure the serving cell of the terminal device or the neighboring cell of the serving cell of the terminal device.

The first cell may alternatively be a satellite cell. The measurement configuration information may indicate the terminal device to measure the satellite cell.

The measurement configuration information may include an identifier of the first cell and the identifier may include at least one of a CGI, a PCI, a frequency, a network device identifier, or a satellite type of a cell.

The identifier of the first cell may be in a plurality of forms.

According to a third aspect, an embodiment may provide a communication method. The method may be performed by a network device or may be performed by a chip having a function of the network device. This is not limited herein. The method includes: receiving a measurement result from a terminal device, where the measurement result indicates that the terminal device obtains a signal of a first cell through measurement or does not obtain a signal of a first cell through measurement; and sending first information to a third network device, where the first information is associated with the measurement result, and the third network device may cover the first cell, or the third network device may be configured to forward the signal of the first cell.

According to the foregoing method, the measurement result is received, and the first information is sent to the third network device, so as to adjust an antenna direction angle corresponding to the first cell or adjust a flight path corresponding to the third network device. Therefore, the foregoing method may be used effectively for correcting an error in cell coverage, and the method has low costs, and may be further applied to a scenario in which a self-correction mechanism of a satellite fails.

The measurement result may further include a signal elevation angle of the first cell. Whether the antenna direction angle corresponding to the first cell needs to be adjusted may be determined based on the signal elevation angle of the first cell in the measurement result.

The measurement result may further include location information of the terminal device.

Whether the antenna direction angle corresponding to the first cell needs to be adjusted, and/or whether a flight path of a network device covering the first cell needs to be adjusted or whether a flight path of a network device used to forward the signal of the first cell needs to be adjusted may be determined based on the location information of the terminal device in the measurement result and other information in the measurement result.

The measurement result may further include information about time at which the terminal device measures the first cell.

Whether the antenna direction angle corresponding to the first cell needs to be adjusted, and/or whether the flight path of the network device covering the first cell needs to be adjusted or whether the flight path of the network device used to forward the signal of the first cell needs to be adjusted are/is determined based on the information about the time at which the terminal device measures the first cell in the measurement result and other information in the measurement result.

The first information may include at least one of the measurement result, information that indicates an antenna direction angle corresponding to the first cell, or information that indicates a flight path of the third network device.

A second network device may send the first information to the third network device in different manners.

According to a fourth aspect, an embodiment may provide a communication apparatus. The apparatus includes a transceiver unit and a processing unit. The processing unit invokes the transceiver unit to: receive measurement configuration information from a first network device, where the measurement configuration information indicates a terminal device to measure a first cell; and send a measurement result to a second network device, where the measurement result is obtained by the terminal device by measuring the first cell based on the measurement configuration information, and the measurement result indicates that the terminal device obtains a signal of the first cell through measurement or does not obtain a signal of the first cell through measurement.

The measurement configuration information may further indicate the terminal device to report a signal elevation angle of the first cell, and the measurement result further includes the signal elevation angle of the first cell.

The measurement configuration information may further indicate the terminal device to report location information of the terminal device, and the measurement result further includes the location information of the terminal device.

The measurement configuration information may further indicate a time at which the terminal device measures the first cell, and the measurement result further includes information about the time at which the terminal device measures the first cell.

The method may further include: sending capability information of the terminal device to the first network device, where the capability information of the terminal device includes at least one of a cell that the terminal device can measure, a measurement frequency band on which the terminal device can perform measurement, or a signal elevation angle measurement error corresponding to the measurement frequency band on which the terminal device can perform measurement.

The first cell may be a serving cell of the terminal device or a neighboring cell of the serving cell of the terminal device.

The first cell may be a satellite cell.

The measurement configuration information may include an identifier of the first cell, and the identifier includes at least one of a cell global identifier (CGI), a physical cell identifier (PCI), a frequency, a network device identifier, or a satellite type of a cell.

According to a fifth aspect, a communication apparatus is provided. The apparatus includes a transceiver unit and a processing unit. The processing unit is configured to determine measurement configuration information, where the measurement configuration information indicates a terminal device to measure a first cell and report that the terminal device obtains a signal of the first cell through measurement or the terminal device does not obtain a signal of the first cell through measurement. The transceiver unit sends the measurement configuration information to the terminal device.

The measurement configuration information may further indicate the terminal device to report a signal elevation angle of the first cell.

the measurement configuration information may further indicate the terminal device to report location information of the terminal device.

the measurement configuration information may further indicate a time at which the terminal device measures the first cell.

the method may further include: receiving capability information of the terminal device from the terminal device, where the capability information of the terminal device includes at least one of a cell that the terminal device can measure, a measurement frequency band on which the terminal device can perform measurement, or a signal elevation angle measurement error corresponding to the measurement frequency band on which the terminal device can perform measurement.

The first cell may be a serving cell of the terminal device or a neighboring cell of the serving cell of the terminal device.

The first cell may be a satellite cell.

The measurement configuration information may include an identifier of the first cell, and the identifier includes at least one of a CGI, a PCI, a frequency, a network device identifier, or a satellite type of a cell.

According to a sixth aspect, a communication apparatus is provided. The apparatus includes a transceiver unit and a processing unit.

The processing unit invokes the transceiver unit to: receive a measurement result from a terminal device, where the measurement result indicates that the terminal device obtains a signal of a first cell through measurement or does not obtain a signal of a first cell through measurement; and send first information to a third network device, where the first information is associated with the measurement result, and the third network device includes the first cell, or the third network device forwards the signal of the first cell.

The measurement result may further include a signal elevation angle of the first cell.

The measurement result may further include location information of the terminal device.

The measurement result may further include information about a time at which the terminal device measures the first cell.

The first information may include at least one of the measurement result, information that indicates an antenna direction angle corresponding to the first cell, or information that indicates a flight path of the third network device.

According to a seventh aspect, an embodiment may provide a communication apparatus. The apparatus may include a processing unit, a sending unit, and a receiving unit. It should be understood that the sending unit and the receiving unit herein may alternatively be a transceiver unit. When the apparatus is a terminal device, the processing unit may be a processor, and the sending unit and the receiving unit may be a transceiver. The apparatus may further include a storage unit, and the storage unit may be a memory. The storage unit is configured to store instructions, and the processing unit executes the instructions stored in the storage unit, to enable the terminal device to perform the method in the first aspect. When the apparatus is a chip in a terminal device, the processing unit may be a processor, and the sending unit and the receiving unit may be input/output interfaces, pins, circuits, or the like. The processing unit executes instructions stored in a storage unit, to enable the chip to perform the method according to the first aspect. The storage unit is configured to store the instructions. The storage unit may be a storage unit (for example, a register or a cache) in the chip, or may be a storage unit (for example, a read-only memory or a random access memory) that is in the terminal device and that is located outside the chip.

According to an eighth aspect, an embodiment may provide a communication apparatus. The apparatus may include a processing unit, a sending unit, and a receiving unit. It should be understood that the sending unit and the receiving unit herein may alternatively be a transceiver unit. When the apparatus is a network device, the processing unit may be a processor, and the sending unit and the receiving unit may be a transceiver. The apparatus may further include a storage unit, and the storage unit may be a memory. The storage unit is configured to store instructions, and the processing unit executes the instructions stored in the storage unit, to enable the network device to perform the method in the second aspect or the third aspect. When the apparatus is a chip in a network device, the processing unit may be a processor, and the sending unit and the receiving unit may be input/output interfaces, pins, circuits, or the like. The processing unit executes instructions stored in a storage unit, to enable the chip to perform the method in the second aspect or the third aspect. The storage unit is configured to store the instructions. The storage unit may be a storage unit (for example, a register or a cache) in the chip, or may be a storage unit (for example, a read-only memory or a random access memory) that is in the network device and that is located outside the chip.

According to a ninth aspect, the embodiments may further provide a non-transitory computer-readable storage medium. The non-transitory computer-readable storage medium stores a computer program. When the computer program is run on a computer, the computer is enabled to perform the method in any one of the first aspect to the third aspect.

According to a tenth aspect, the embodiments may further provide a computer program product including a program. When the computer program product runs on a computer, the computer is enabled to perform the method in any one of the first aspect to the third aspect.

According to an eleventh aspect, the embodiments may further provide a communication apparatus, including a processor and a memory. The memory is configured to store computer-executable instructions, and the processor is configured to execute the computer-executable instructions stored in the memory, to enable the communication apparatus to perform the method in any one of the first aspect to the third aspect.

According to a twelfth aspect, the embodiments may further provide a communication apparatus, including a processor and an interface circuit. The interface circuit is configured to receive code instructions and transmit the code instructions to the processor, and the processor runs the code instructions to perform the method in any one of the first aspect to the third aspect.

DETAILED DESCRIPTION OF THE EMBODIMENTS

The following describes the embodiments with reference to the accompanying drawings.

The following briefly describes concepts in a conventional technology that are related to the embodiments.

1. Radio Resource Control (RRC) State

Figure 1:
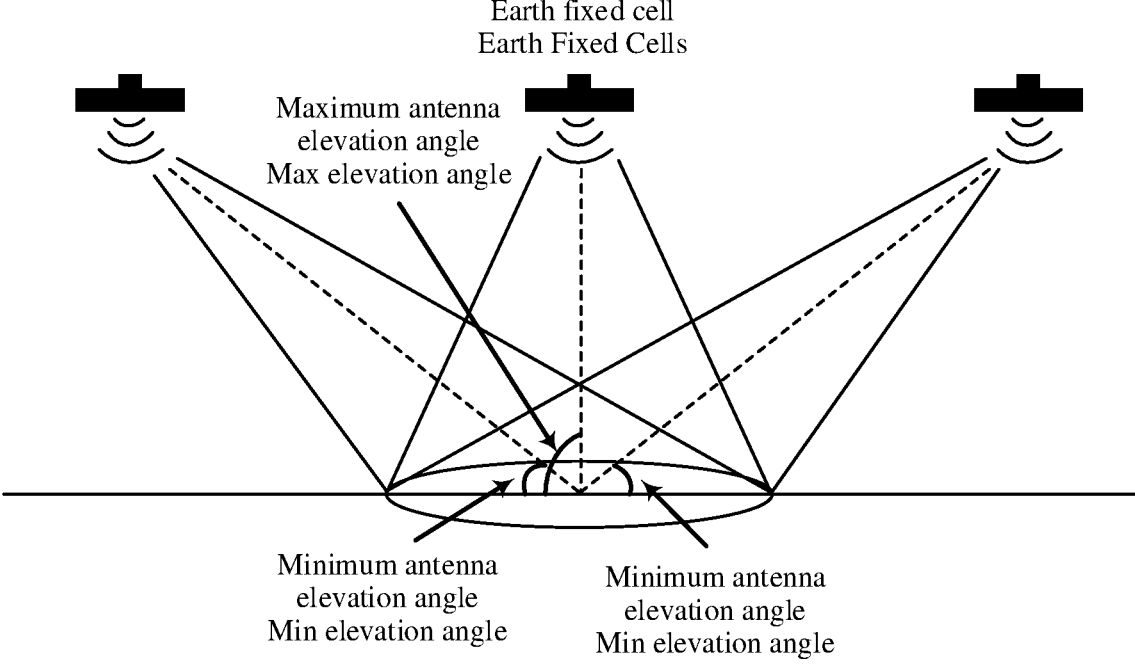
FIG. 1 is a schematic diagram of a fixed cell in the background.
Figure 2:
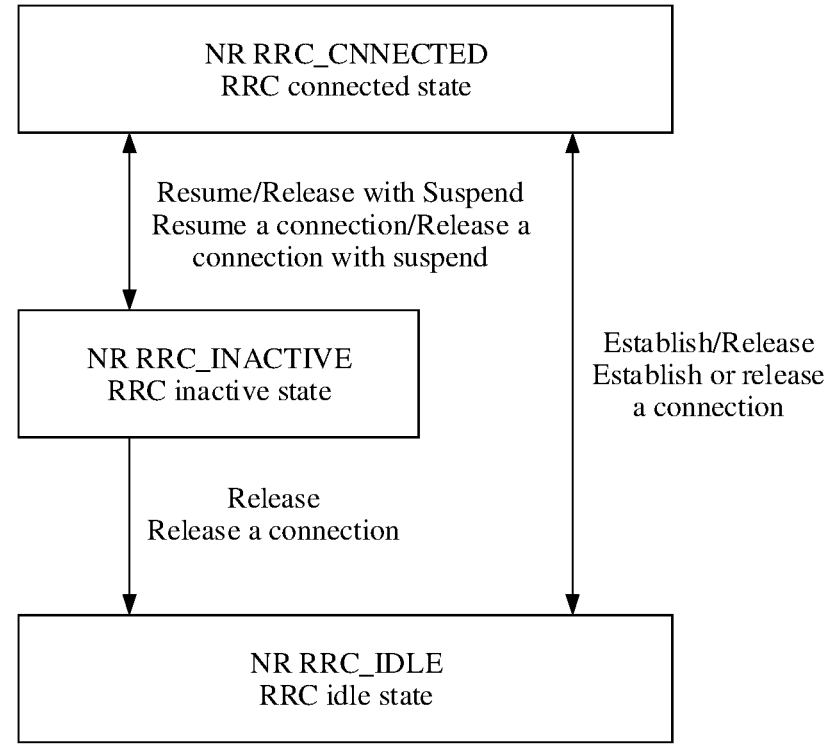
FIG. 2 is a schematic diagram of RRC state switching of a terminal device according to an embodiment.

In new radio (NR), an RRC state of a terminal device includes a connected state (RRC_CONNECTED), an inactive state or a third state (RRC_INACTIVE), and an idle state (RRC_IDLE). When the terminal device is in the RRC_CONNECTED state, a link has been established between the terminal device and both a network device and a core network. When data arrives at the core network, the data may be directly transmitted to the terminal device. When the terminal device is in the RRC_INACTIVE state, it indicates that the terminal device has previously established a link with a network device and a core network, but the link from the terminal device to the network device is released. Although the link is released, the network device stores a context of the terminal device. When data needs to be transmitted, the network device can quickly restore the link. When the terminal device is in the RRC_IDLE state, there is no link between the terminal device and the network device or the core network. When data needs to be transmitted, links from the terminal device to the network device and the core network need to be established. FIG. 2 shows transition between the three states.

2. Satellite Communication

Satellite communication, namely, non-terrestrial communication (non-terrestrial network, NTN), has been a hot research field since the 1960s. Thanks to a current concept of "anytime and anywhere" communication, satellite communication is to play a more important role in the future. Generally, a higher orbit of a satellite indicates larger coverage of the satellite but a longer communication delay. Generally, orbits of satellites may be classified based on altitudes into:

(1) a LEO whose orbit altitude ranges from 160 km to 2000 km;

(2) a medium earth orbit (MEO) whose orbit altitude ranges from 2000 km to 35786 km; and (3) geostationary earth orbit (GEO) whose orbit altitude is 35786 km, where a location, relative to the earth, of a satellite revolving in this orbit is not affected by rotation of the earth.

A LEO satellite is closer to the ground and has a shorter communication delay and a higher data transmission rate. In addition, a weight and size of a mobile terminal are almost the same as those of a personal mobile device. Therefore, the LEO satellite is more suitable for the popularization of the mass market and become a hot topic of the current industry development. Since 1990, several low-orbit and medium-orbit satellite communication networks have officially provided commercial services and include the low-orbit Iridium satellite network and the medium-orbit O3b network.

3. Measurement Mechanism

Mobility management is an important part in wireless mobile communication. Mobility management is a general term of related content used to ensure that interruption of a communication link between a network device and a terminal device is not caused by movement of the terminal device. Based on states of the terminal device, mobility management may be roughly classified into two parts: mobility management in an idle state and mobility management in a connected state. The mobility management in the idle state/ an inactive state refers to a cell selection/reselection process. The mobility management in the connected state refers to a cell handover process. Both cell selection/reselection and cell handover are performed based on a measurement result. Therefore, mobility measurement is the basis of mobility management.

In NR, an overall measurement procedure is as follows.

Based on used layers, the measurement is classified into physical layer measurement (layer 1 measurement) and RRC layer measurement (layer 3 measurement). At a physical layer, the terminal device performs a specified type of measurement on a configured measurement resource. All measurement types supported in NR are defined in 38.215.

For synchronization signal block (SSB)-based measurement, the terminal device combines measurement results obtained on a plurality of SSBs having a same SSB index and a same physical cell identifier (PCI), to obtain a beam-level layer 1 measurement result of the SSBs corresponding to the SSB index of a cell corresponding to the PCI and reports the beam-level layer 1 measurement result to a layer 3.

For channel state information-reference signal (CSI-RS)-based measurement, the terminal device combines measurement results obtained on a plurality of CSI-RS resources that have a same CSI-RS resource identifier and a same PCI, to obtain a beam-level layer 1 measurement result of the CSI-RS resources corresponding to the CSI-RS resource identifier of a cell corresponding to the PCI and reports the beam-level layer 1 measurement result to a layer 3.

The foregoing process of combining measurement results on a plurality of measurement resources is layer 1 filtering. A combination manner is an implementation of the terminal device and is not specified in the standard. However, the terminal device needs to ensure that the measurement meets a series of indicators in terms of a delay and precision as defined in 38.133.

After the beam-level measurement result reported at the layer 1 is received at the layer 3, the terminal device needs to select/combine layer 1 measurement results of beams in a same cell, to derive a cell-level layer 3 measurement result. A selection/combination manner is defined in 38.331. The terminal device further needs to perform layer 3 filtering on the obtained cell-level layer 3 measurement result. It should be noted that only a measurement result obtained by performing layer 3 filtering can be used to verify whether a reporting trigger condition is met and can be reported as a final measurement result.

In addition, based on a configuration, the terminal device may also need to report a beam-level layer 3 measurement result. In this case, the terminal device directly performs layer 3 filtering on the layer 1 measurement result of each beam, then selects a to-be-reported measurement result from filtered measurement results and reports the measurement result. A selection manner is defined in 38.331.

38.300 requires that the terminal device verify the reporting trigger condition at least when a new cell-level measurement result is generated. When the reporting trigger condition is met, the terminal device needs to send a measurement report to the network device.

4. Minimization of Drive Tests (MDT)

A basic idea of an MDT technology is that an operator partially replaces conventional drive test work with a commercial terminal device of a subscribed user to perform measurement reporting, so as to automatically collect measurement data of the terminal device and detect and optimize a problem and a fault in a wireless network. Application scenarios of the technology are as follows: An operator usually performs routine network coverage drive tests every month, and also performs call quality drive tests in areas to address user complaints. The MDT may be used to replace the drive tests in these scenarios.

Measurement types of the existing MDT technology may be classified into the following types.

1. Signal level measurement: The terminal device measures a signal level of a radio signal and reports a measurement result to a network device or a network device controller.

2. Quality of service (QoS) measurement: Generally, a network device performs QoS measurement (for example, measurement on traffic of a service, a throughput of a service, or a service delay). Alternatively, the terminal device may perform measurement, for examplmeasurement on an uplink processing delay. Alternatively, the network device and the terminal device may together perform measurement, for example, air interface delay measurement, measurement on a time period in which a data packet passes through a service data adaptation protocol (SDAP), packet data convergence protocol (PDCP) layer of the network device and arrives at an SDAP layer/a PDCP layer of the terminal device).

3. Accessibility measurement: the terminal device records information about an RRC connection setup failure and reports the information to a network device or a network device controller.

The MDT includes logged MDT and immediate MDT. The immediate MDT is used for measurement for a terminal device in an RRC connected state, and the logged MDT is used for measurement for a terminal device in an idle state or a terminal device in an inactive state (where for example, the terminal device in the idle state or the terminal device in the inactive state measures a cell at a frequency corresponding to a cell on which the terminal device currently camps and measures an inter-frequency/inter-RAT neighboring cell corresponding to cell reselection as broadcast in the cell on which the terminal device currently camps). The immediate MDT is generally used to measure a data volume, an internet protocol (IP) throughput rate, a packet transmission delay, a packet loss rate, a processing delay, and the like of the terminal device. The logged MDT generally refers to measurement performed by the terminal device on received signal strength.

In addition, some L2 measurement is defined for a network side to collect statistics on some network performance, so as to perform functions such as radio link management, radio resource management, and network maintenance. The foregoing some L2 measurement is performed for one terminal device, for example, on a service throughput, service traffic, a processing delay of the terminal device, or an air interface delay of the terminal device.

In two scenarios, the network device initiates an MDT measurement collection task. One is to initiate signaling based MDT and the other is to initiate management based MDT. The signaling based MDT refers to MDT for a terminal device. The network device receives, from a core network, a message for performing MDT for a terminal device. The management based MDT is not MDT for a terminal device. The network device receives a message for performing MDT from an operation, administration, and maintenance (OAM). The network device selects, according to a policy, a terminal device from terminal devices served by the network device, to perform MDT measurement. In the signaling based MDT, unless the terminal device has agreed on performing the MDT, a core network does not initiate the signaling based MDT for the terminal device. In the management based MDT, when selecting a terminal device, the network device may consider whether the terminal device agrees on performing the MDT. For example, the network device selects only terminal devices that have agreed to perform the MDT to perform MDT measurement (where for example, a core network notifies a base station of whether a terminal device agrees on performing the MDT, for example, the core network notifies the network device of a management based MDT allowed indication (management based MDT allowed indication) of the terminal device, and optionally, notifies the network device of a management based MDT public land mobile network (PLMN) list). Both the two types of MDT may include the logged MDT and the immediate MDT. In the signaling based MDT, the core network notifies a base station of some MDT configuration information and an IP address of a trace collection entity (TCE). The MDT configuration information includes an MDT activation type (for example, immediate MDT only, logged MDT only, or immediate MDT and trace (Immediate MDT and Trace)), an MDT area range, an MDT mode and a configuration parameter of the corresponding mode (for example, a measurement event of the immediate MDT, or a recording interval and duration of the logged MDT), and a signaling based MDT PLMN list.

Figure 3:
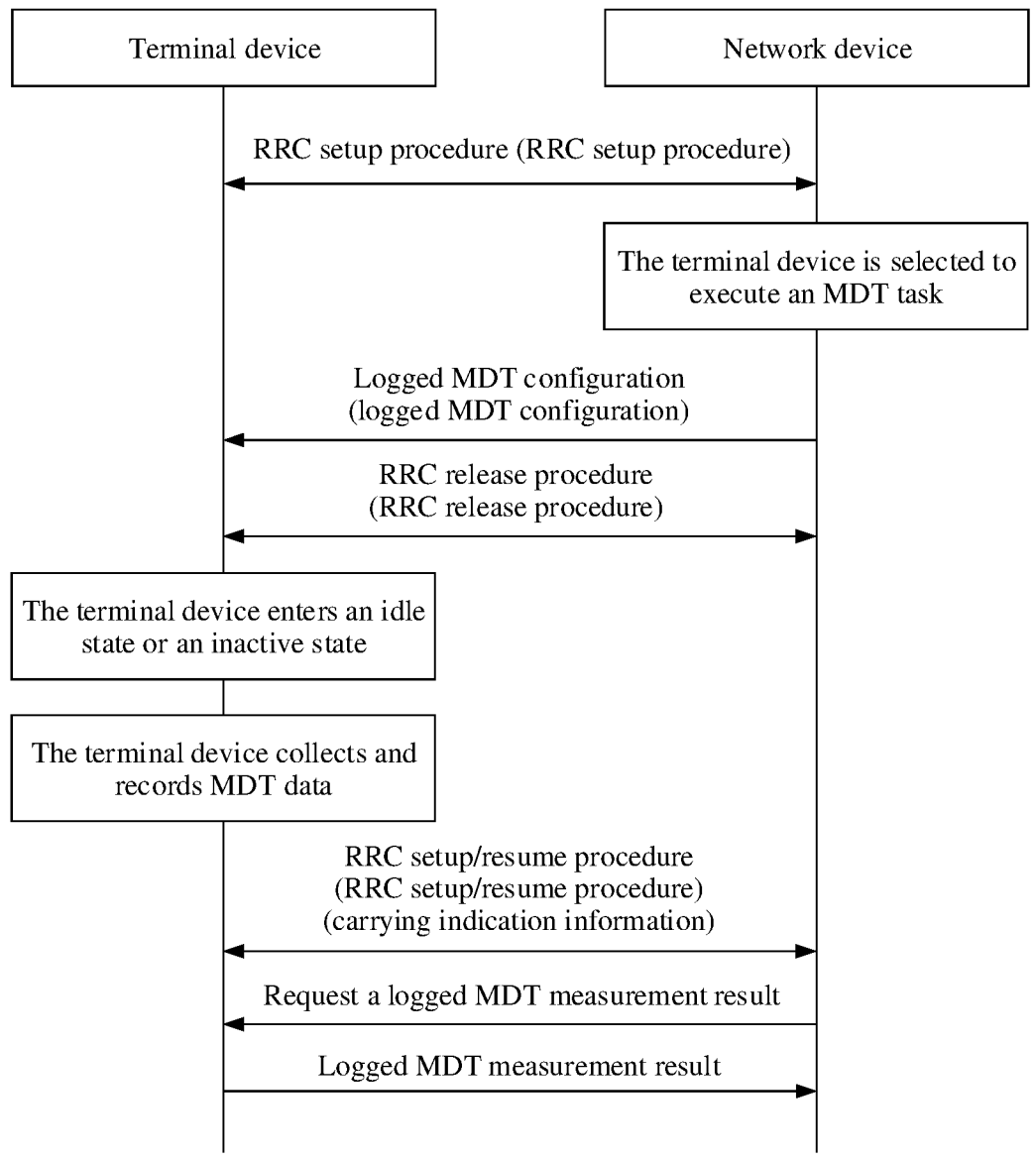
FIG. 3 is a schematic flowchart of logged MDT measurement according to an embodiment.

In addition, in the logged MDT, when the terminal device is in the connected state, the network device configures logged MDT measurement-related configuration information for the terminal device, for example, notifies the terminal device of a logged MDT-related configuration based on an RRC message. When the terminal device enters the idle state or the inactive state, the terminal device records a corresponding measurement result based on the corresponding configuration. When initiating an RRC connection to the network device, the terminal device carries indication information in an RRC message, to indicate that the current terminal device records a logged MDT measurement result. The network device may send a request for the logged MDT measurement result to the terminal device, and then the terminal device reports the logged MDT measurement result to the network device. For example, the indication information is carried in an RRC setup complete message. Then, the network device requests, in an information request (UE information request) of the terminal device, the terminal device to transmit the logged MDT measurement result (where the request carries request indication information, to indicate the terminal device to upload the logged MDT measurement result). Then, the terminal device uploads an MDT record to the network side in an information response (UE Information Response) of the terminal device. Details are shown in FIG. 3. In addition, it should be understood that a network device that performs logged MDT measurement-related configuration for the terminal device may not be a same network device as a network device to which the terminal device reports the logged MDT measurement result.

Figure 4:
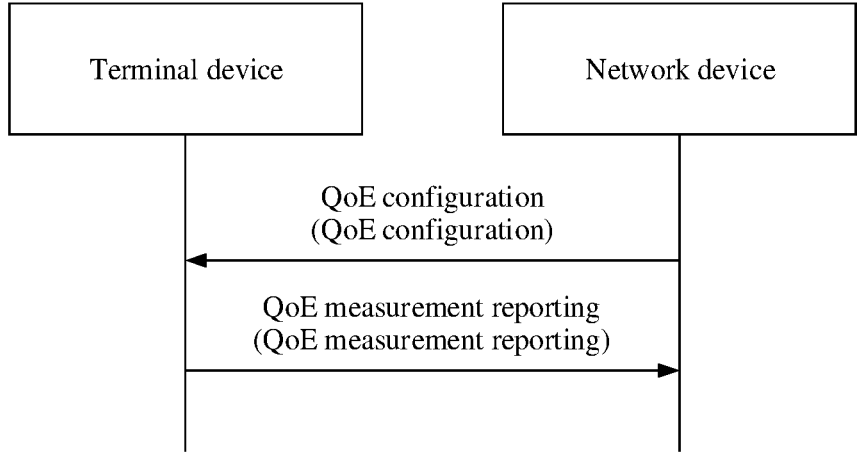
FIG. 4 is a schematic flowchart of QoE measurement according to an embodiment.

For some streaming services or voice services, such as a streaming media service (streaming service) and a multimedia telephony service for IMS (MTSI), only signal quality cannot reflect user experience of these services. However, the operator wants to know user experience to optimize the network to improve user experience. Such measurement collection is referred to as quality of experience (QoE) measurement collection or may be referred to as application layer measurement collection. This type of measurement is also initiated by using the signaling based MDT and the management based MDT. The network device receives configuration information of such measurement from the core network or the OAM (where for example, the configuration information is sent to the network device in a transparent container manner), and the network device sends the configuration to the terminal device based on an RRC message. After receiving measurement results of an application layer from an upper layer of the UE, an RRC layer of the terminal device sends the measurement results to the network device (where for example, the measurement results are sent to the network device in a transparent container encapsulation form). In addition to the configuration information of the foregoing measurement, information received by the network device from the core network or the OAM may further include other information of QoE measurement (for example, an area range of QoE measurement and a service type of QoE measurement), as described in section 9.2.1.128 in 36.413. A method used by the network device to select a terminal device to perform QoE measurement is basically the same as that in common MDT measurement. As shown in FIG. 4, for QoE measurement, a network side configures a signaling bearer (for example, a signaling radio bearer (SRB) 4) for the terminal device to transmit a QoE measurement result. The measurement result of the terminal device may be reported through the signaling bearer. Similarly, a network device that configures a QoE measurement-related configuration for the terminal device may not be a same network device as a network device to which the terminal device reports the QoE measurement result.

5. Self-Organization Network (SON)

SON refers to a network that does not require an additional network device and can maximize use of existing devices to reduce operation costs.

In terms of use of devices, load balancing and coverage capacity optimization can be used to optimize coverage without adding a new device, and mobility optimization and random access optimization can also be used to improve performance of the existing devices.

The costs can be reduced by reducing a quantity of and skill requirements on operation maintenance personnel. For example, an MDT technology is used to reduce manual roadside costs, and an energy saving (ES) technology is used to save energy, so as to improve system performance in these automatic maintenance processes.

The ultimate goal of an SON technology is to realize complete automation of network planning and optimization, thus realizing the self-organization network in the real sense.

Currently, 3GPP has defined some cases to study the SON. Use cases defined in 3GPP Long Term Evolution (LTE) include an automatic neighbor relation (ANR), physical cell identity selection (PCI selection), mobility robustness optimization (MRO), mobility load balancing (MLB), ES, MDT, and coverage and capability optimization (CCO). For details, refer to section 22.4 in TS 36.300.

Some use cases are also discussed in an NR SON in R16, and include MRO, PCI selection, MLB, ES, MDT, and CCO. In addition, some new functions, such as a V2X SON, to be introduced are also discussed in the NR SON. For details, refer to TR 37.816.

6. PCI

A terminal device may obtain a PCI of a cell in a manner such as based on a cell synchronization signal found in a cell measurement process.

The PCI includes a primary synchronization signal (PSS) and a secondary synchronization signal (SSS). When the terminal device measures the synchronization signal, a physical layer attempts to perform decoding by using different PCIs, and a PCI that can be used for correct decoding is the PCI of the cell. The terminal device distinguishes between different radio signals based on different PCIs. In an LTE system, a total of 504 PCIs ranging from 0 to 503 are provided. In a 5G system, a total of 1008 PCIs ranging from 0 to 1007 are provided.

The PCI is one of cell identifiers and is a local identifier. Different cells correspond to different network frequencies. Therefore, different cells may be distinguished based on the frequencies and PCIs. In other words, as long as one of frequency and the PCI is different, the terminal device can distinguish between two different cells. During network deployment, an operator needs to avoid using the same frequency and PCI for deploying neighboring cells.

Figure 5:
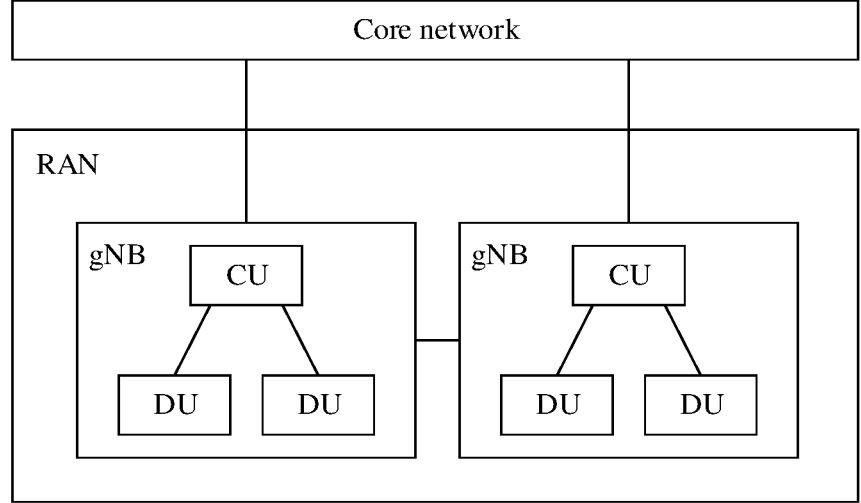
FIG. 5 is a schematic diagram of a structure of a network device according to an embodiment.

As shown in FIG. 5, a network device in the embodiments may be a base station (for example, a gNB) in a RAN. The base station may be an architecture in which a centralized unit (CU) is separated from a distributed unit (DU). The RAN may be connected to a core network (for example, may be an LTE core network or a 5G core network). It may be understood that the base station is divided into the CU and the DU from the perspective of a logical function. The CU and the DU may be physically separated or deployed together. A plurality of DUs may share one CU. One DU may alternatively be connected to a plurality of CUs (not shown in the figure). The CU and the DU may be connected over an interface, for example, an F1 interface. The CU and the DU may be obtained through division based on protocol layers of a wireless network. For example, a possible division manner is that the CU is configured to perform functions of a radio resource control (RRC) layer, a service data adaptation protocol (SDAP) layer, and a packet data convergence protocol (PDCP) layer, and the DU is configured to perform functions of a radio link control (RLC) layer, a media access control (MAC) layer, a physical layer, and the like. It may be understood that, division into processing functions of the CU and the DU based on the protocol layers is merely an example, and there may be other division. For example, the CU or the DU may have functions of more protocol layers through division. For example, the CU or the DU may alternatively have some processing functions of the protocol layers through division. Some functions of the RLC layer and functions of a protocol layer above the RLC layer may be set on the CU, and remaining functions of the RLC layer and functions of a protocol layer below the RLC layer may be set on the DU. Functions of the CU or the DU may alternatively be obtained through division based on a service type or another system requirement. For example, division is performed based on a latency, a function whose processing time needs to satisfy a latency requirement is set on the DU, and a function whose processing time does not need to satisfy the latency requirement is set on the CU. A network architecture shown in FIG. 5 may be applied to a 5G communication system and may alternatively share one or more components or resources with an LTE system. The CU may alternatively have one or more functions of the core network. One or more CUs may be disposed in a centralized manner or a separated manner. For example, the CUs may be disposed on a network side for ease of centralized management. The DU may have a plurality of radio frequency functions, or the radio frequency functions may be disposed remotely.

Functions of the CU may be implemented by one entity or may be implemented by different entities. For example, the functions of the CU may be further divided. For example, a control plane (CP) and a user plane (UP), namely, a control plane of the CU (CU-CP) and a user plane of the CU (CU-UP), are separated. For example, the CU-CP and the CU-UP may be implemented by different functional entities. The CU-CP and the CU-UP may be coupled to the DU to jointly implement a function of the base station.

A terminal may be a wireless terminal or a wired terminal. The wireless terminal may refer to a device that provides a user with voice and/or data connectivity, a handheld device with a radio connection function, or another processing device connected to a radio modem. The wireless terminal may communicate with one or more core networks through a radio access network (RAN for short). The wireless terminal may be a mobile terminal, such as a mobile phone (also referred to as a "cellular" phone) and a computer with a mobile terminal, for example, may be a portable, pocket-sized, handheld, computer built-in, or in-vehicle mobile apparatus that exchanges voice and/or data with the radio access network. For example, the wireless device may be a device such as a personal communications service (PCS) phone, a cordless telephone set, a session initiation protocol (SIP) phone, a wireless local loop (WLL) station, or a personal digital assistant (PDA). The wireless terminal may also be referred to as a system, a subscriber unit (SU), a subscriber station (SS), a mobile station (MB), a mobile, a remote station (RS), an access point (AP), a remote terminal (RT), an access terminal (AT), a user terminal (UT), a user agent (UA), a user device (UD), or user equipment (UE).

The embodiments may be applied to a fourth generation (the fourth generation, 4G) system, a 5G system, an NTN system, or a future mobile communication system.

Figure 6A:
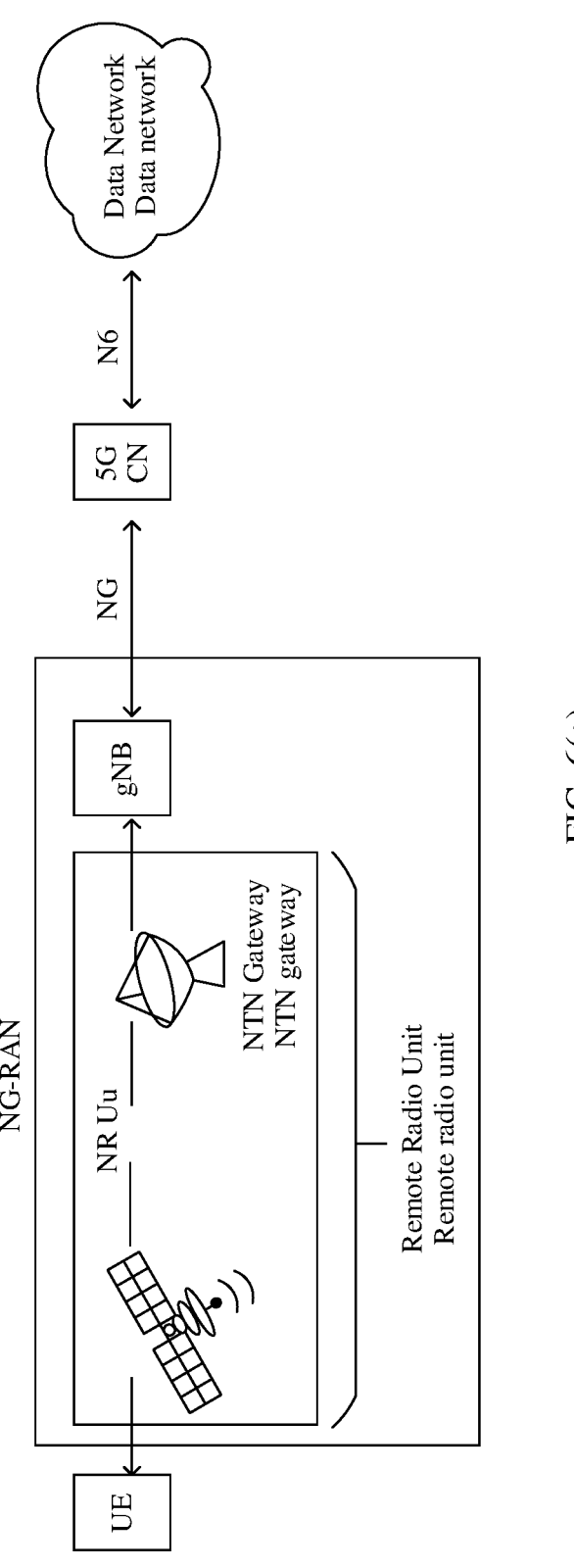
FIG. 6(a) to FIG. 6(d) are schematic diagrams of an NTN RAN architecture according to an embodiment.
Figure 6B:
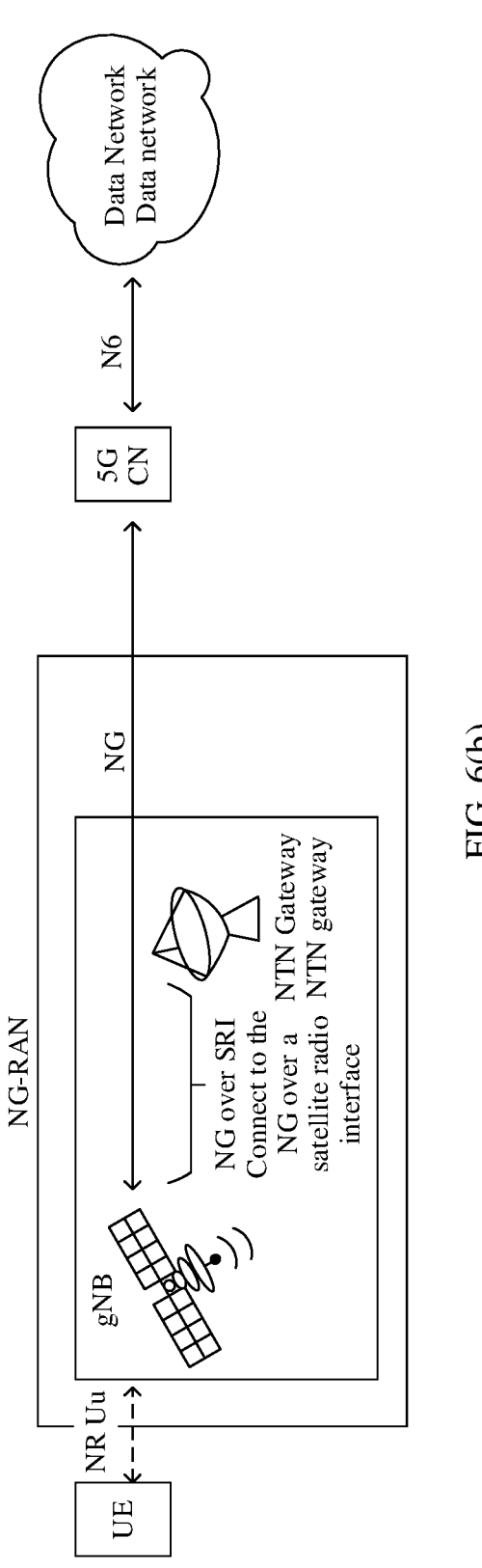
Figure 6C:
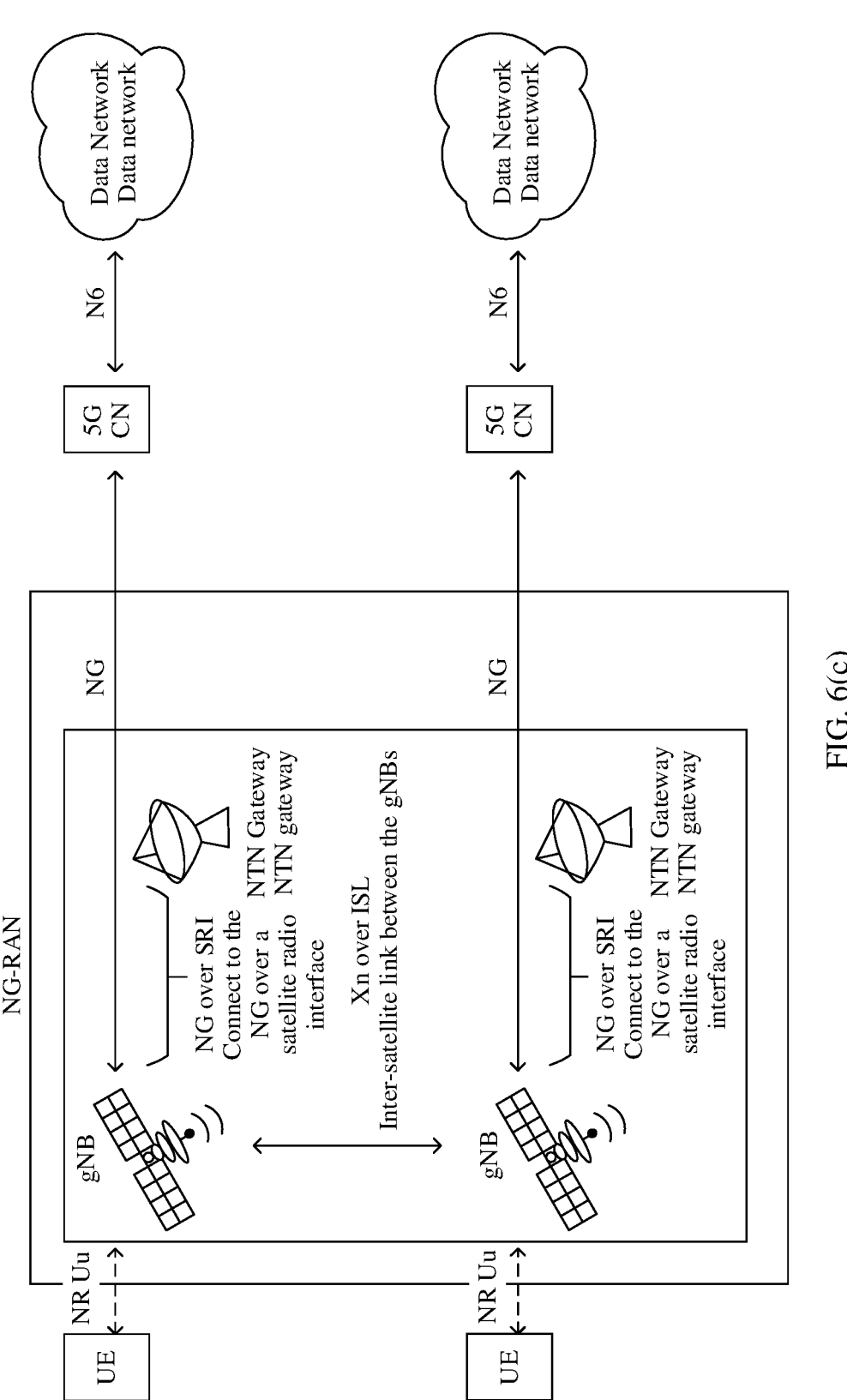
Figure 6D:
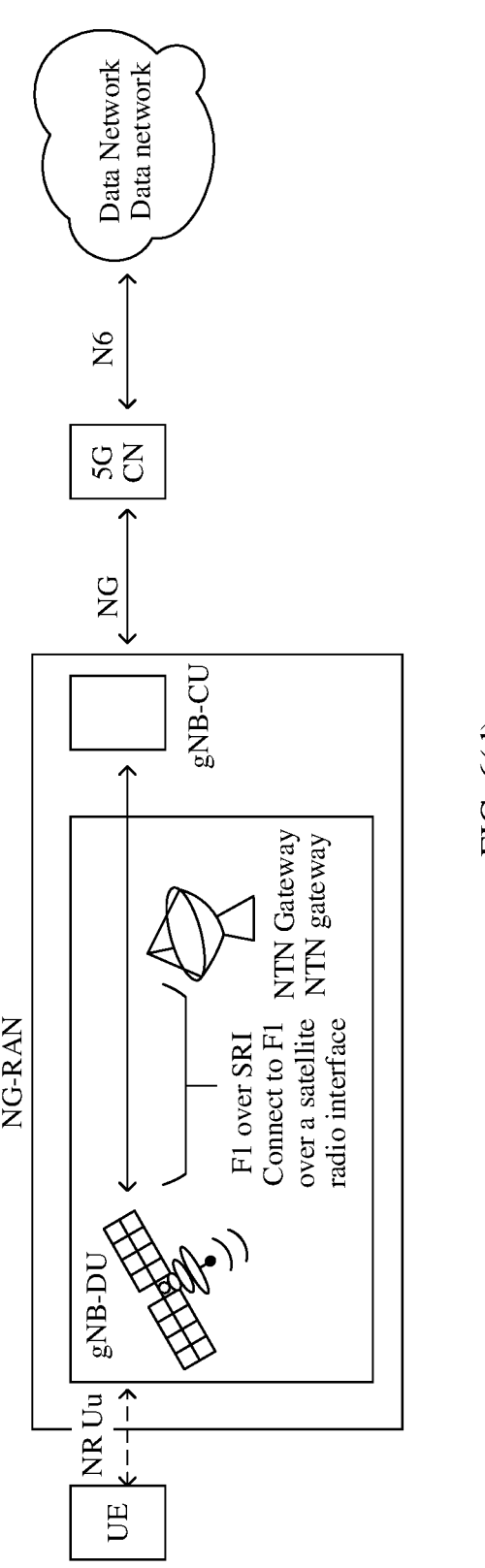

TR38.821 defines five NTN-based next-generation radio access network (RAN) architectures (NTN-based NG-RAN architectures). As shown in FIG. 6(a), in a first architecture, a satellite serves as an L1 relay, and a function of the satellite is radio frequency filtering, radio frequency conversion, amplification, and the like. As shown in FIG. 6(b) and FIG. 6(c), in a second architecture and a third architecture, a satellite may serve as a network device, for example, a base station. A difference between the second architecture and the third architecture lies in that the second architecture does not include an inter-satellite link (inter-satellite link, ISL), and the third architecture includes an ISL. As shown in FIG. 6(d), in a fourth architecture, a satellite may serve as a distributed unit (DU). In a fifth architecture, a satellite may serve as an integrated access and backhaul (IAB) node.

In a possible application scenario, a LEO satellite or a GEO satellite serves as an independent base station and is connected to a core network. Alternatively, a LEO satellite or a GEO satellite serves as a relay base station and is connected to a terrestrial base station. Alternatively, a LEO satellite is used as a DU and is connected to a ground CU.

In addition, the embodiments are also applicable to another future-oriented communication technology. Network architectures and service scenarios are intended to describe the embodiments more clearly, and do not constitute a limitation on the embodiments. A person of ordinary skill in the art may know that: with evolution of network architectures and emergence of new service scenarios, the solutions provided in the embodiments are also applicable to a similar problem.

Figure 7:
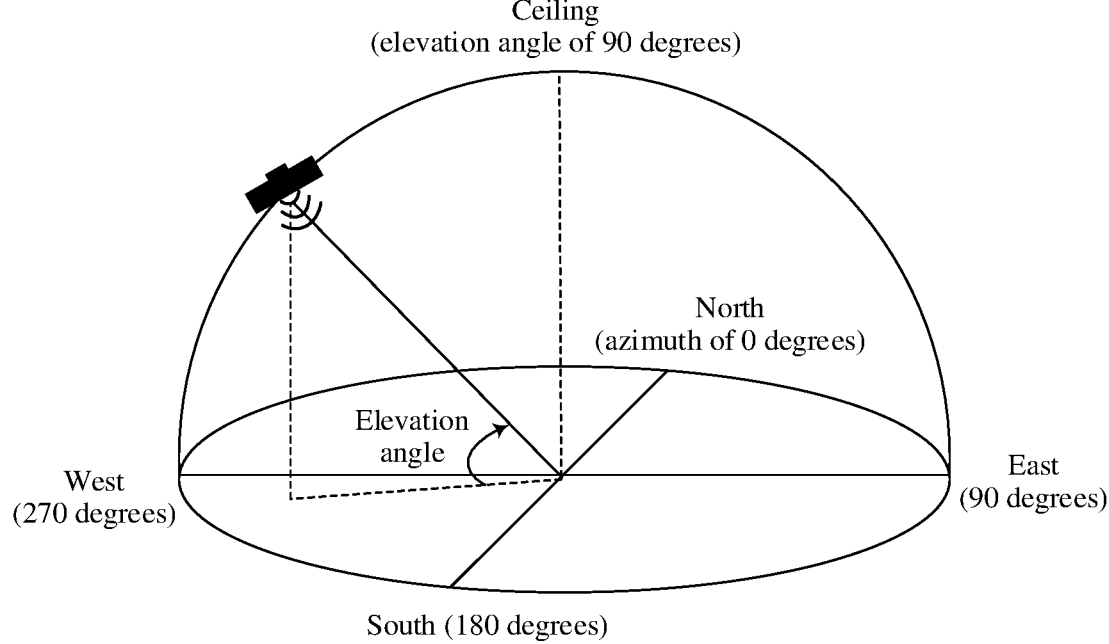
FIG. 7 is a schematic diagram of a signal elevation angle according to an embodiment.

In the embodiments, as shown in FIG. 7, a signal elevation angle is an included angle between a signal during projection and a horizontal plane. The signal herein may be a signal transmitted by a satellite, a signal transmitted by a terrestrial base station, or a signal transmitted by a device in another communication system. For example, the signal may be a synchronization signal block (SSB) or a channel state information reference signal (CSI-RS). This is not limited in the embodiments. For example, when a satellite runs in an orbit, an elevation angle of a signal sent at a fixed location at each moment by using a fixed antenna direction angle is determined. Therefore, the signal elevation angle may also be used to help the satellite determine whether an antenna direction angle at a moment is correct.

Figure 8:
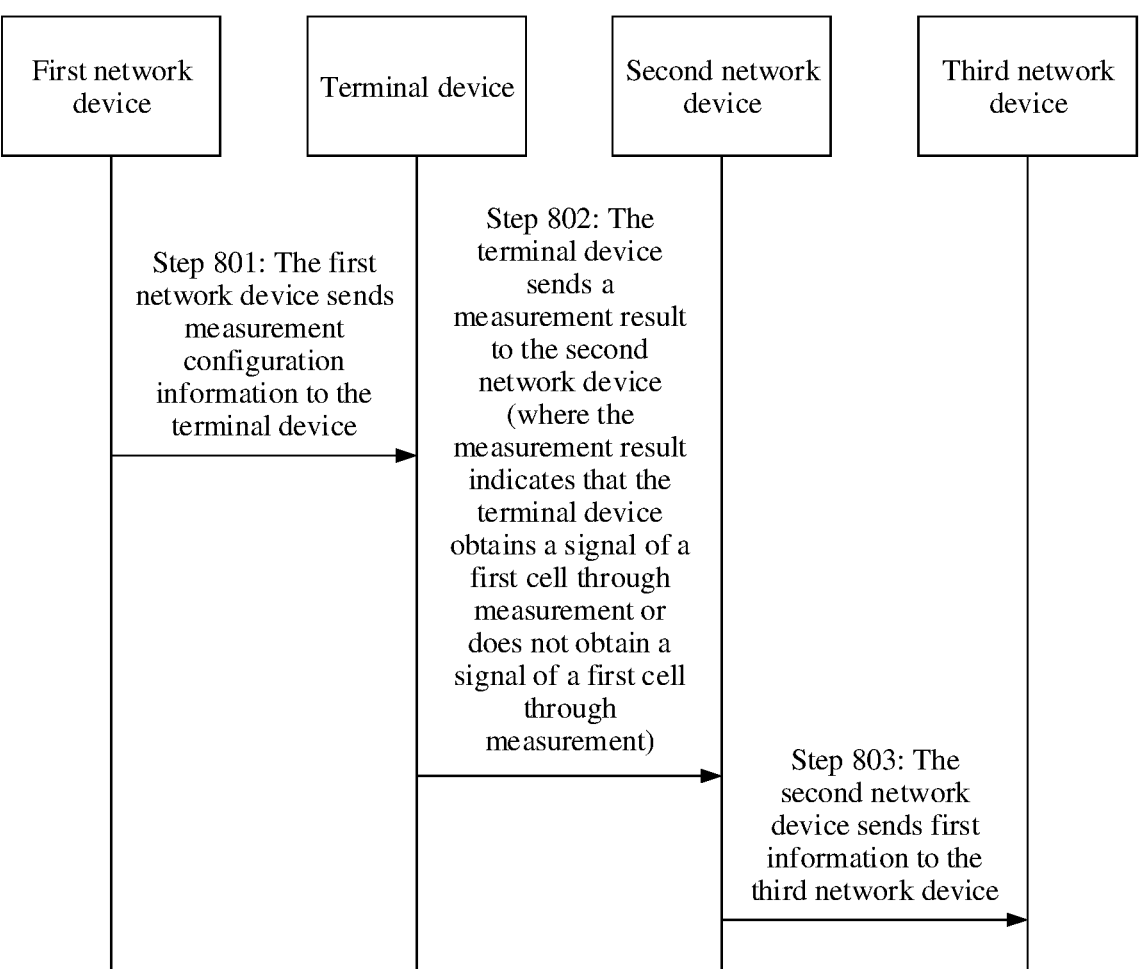
FIG. 8 is an overview flowchart 1 of a communication method according to an embodiment.

As shown in FIG. 8, an embodiment may provide a communication method, to correct an error in cell coverage. The method includes the following steps.

Step 801: A first network device sends measurement configuration information to a terminal device, where the measurement configuration information indicates the terminal device to measure a first cell.

For step 801, the first network device may include the measurement configuration information in system broadcast (SI) or dedicated signaling. For example, the dedicated signaling may be an RRC reconfiguration message or may be other signaling. This is not limited in this embodiment.

In some embodiments, the first cell may be a serving cell of the terminal device or a neighboring cell of the serving cell of the terminal device, and the first cell may be a satellite cell. For example, the serving cell of the terminal device may be a satellite cell, or the neighboring cell of the serving cell of the terminal device is a satellite cell.

The measurement configuration information may include an identifier of the first cell. The identifier herein includes, but is not limited to, at least one of a cell global identifier (cell global identifier, CGI), a PCI, a frequency, a network device identifier, or a satellite type of a cell. For example, the measurement configuration information may include a CGI corresponding to the first cell, a frequency and a PCI corresponding to the first cell, or a frequency, a PCI, and a satellite type corresponding to the first cell.

In addition, the measurement configuration information may further indicate a plurality of cells. In other words, the measurement configuration information may include identifiers of the plurality of cells. This is not limited in the embodiments. For example, the measurement configuration information may carry a measurement object, and the measurement object may include an identifier of at least one cell, for example, an identifier of the serving cell of the terminal device and/or an identifier of the neighboring cell of the serving cell of the terminal device.

The measurement configuration information may further include, but is not limited to, at least one of the following content.

1. The measurement configuration information further indicates the terminal device to report a signal elevation angle of the first cell. Correspondingly, the terminal device measures the signal elevation angle of the first cell based on the measurement configuration information, and a measurement result sent by the terminal device further includes the signal elevation angle of the first cell. For example, when obtaining a cell A through measurement, the terminal device further measures a signal elevation angle of the cell A.

2. The measurement configuration information further indicates the terminal device to report location information of the terminal device. Correspondingly, a measurement result further includes the location information of the terminal device.

It should be understood that the location information of the terminal device may be absolute location information of the terminal device, for example, global positioning system (GPS) information of the terminal device. Alternatively, the location information of the terminal device may be relative location information of the terminal device, for example, location information of the terminal device relative to a reference point. The relative location information may include a direction and a distance. For example, the relative location information of the terminal device may be a relative direction and a distance from the terminal device to a cell center. The cell center may be specified in a communication protocol or may be notified to the terminal device via the first network device. For example, location information of the cell center may be sent in the system broadcast or the dedicated signaling.

3. The measurement configuration information further indicates time at which the terminal device measures the first cell, and a measurement result sent by the terminal device may include information about the time at which the terminal device measures the first cell.

The measurement configuration information may indicate a start moment at which the terminal device measures the first cell. The start moment herein may be an absolute value or a relative value. This is not limited in the embodiments. For example, the measurement configuration information indicates a start moment, for example, absolute time, at which the terminal device measures the first cell, or the measurement configuration information indicates N seconds that are between a moment at which the terminal device receives the measurement configuration information and a moment at which the terminal device starts to measure the first cell, where N is a positive integer. It may be understood that the information about the time in the measurement result may also be an absolute value or a relative value of the start moment at which the terminal device starts to measure the first cell.

For example, the measurement configuration information may further indicate the terminal device to periodically measure the first cell or indicate a quantity of times for which the terminal device measures the first cell. For example, the quantity of times herein may be one or more.

4. The measurement configuration information further indicates a measurement manner used by the terminal device to measure the first cell, and the measurement manner includes MDT or mobility measurement. For example, the MDT herein may be logged MDT or immediate MDT. In addition, the method provided in this embodiment may be further applied to measurement in a self-organization network.

In addition, the measurement configuration information further indicates a trigger condition for measuring the first cell by the terminal device. Correspondingly, if determining that the trigger condition is met, the terminal device measures the first cell based on the measurement configuration information.

In some embodiments, the trigger condition is that the terminal device starts to measure the first cell after receiving the measurement configuration information from the network device. For example, the terminal device immediately measures the first cell after receiving the measurement configuration information from the network device.

In some other embodiments, the trigger condition is that after receiving the measurement configuration information from the network device, the terminal device starts to measure the first cell when determining that a preset condition is met. For example, the measurement configuration information further includes a preset value corresponding to a signal quality parameter. After receiving the measurement configuration information from the network device, the terminal device monitors the signal quality parameter, and starts to measure the first cell when determining that the signal quality parameter of the first cell is less than the preset value. The signal quality parameter may be RSRP, RSRQ, or the like. This is not limited in the embodiments.

It should be understood that the preset value corresponding to the signal quality parameter may be configured by the first network device or may be specified in a communication protocol. When the preset value corresponding to the signal quality parameter is configured by the first network device, the preset value corresponding to the signal quality parameter may be carried in the measurement configuration information or may be carried by using other signaling. This is not limited in the embodiments.

It should be understood that content included in the foregoing measurement configuration information is merely an example and is not intended to limit the embodiments.

Step 802: The terminal device sends the measurement result to a second network device, where the measurement result indicates that the terminal device obtains a signal of the first cell through measurement or does not obtain a signal of the first cell through measurement.

The measurement result is obtained by the terminal device by measuring the first cell based on the measurement configuration information.

It should be understood that, that the terminal device does not obtain a signal of the first cell through measurement means that the signal quality parameter corresponding to the first cell is less than a first value. For example, the signal quality parameter may be the reference signal received power (RSRP), the reference signal received quality (RSRQ), or the like. When the RSRP, of the first cell, obtained through measurement by the terminal device is less than −110 dBm, it is determined that the terminal device does not obtain the signal of the first cell through measurement.

For step 802, the measurement result may be sent as one piece of information or may be separately sent as a plurality of pieces of information. For example, information that indicates that the terminal device obtains the signal of the first cell through measurement is sent as one piece of information, and the signal elevation angle of the first cell, the location information of the terminal device, and the information about the time at which the terminal device measures the first cell are sent as another piece of information. Alternatively, the information that indicates that the terminal device obtains the signal of the first cell through measurement, the signal elevation angle of the first cell, the location information of the terminal device, and the information about the time at which the terminal device measures the first cell are sent as one piece of information.

In an example, the terminal device may actively send the measurement result to the second network device. For example, when the terminal device is in a connected state, the terminal device may send the measurement result to the second network device after completing measurement for the first cell.

In another example, the terminal device sends notification information to the second network device, where the notification information is used to notify the second network device that the terminal device stores the measurement result, or the notification information is used to query whether the second network device needs the terminal device to report the measurement result. After the second network device receives the notification information from the terminal device, the second network device sends a request message to the terminal device, where the request message is used to request the terminal device to send the measurement result to the second network device. For example, if the terminal device is configured to perform the logged MDT, when the terminal device enters an idle state or an inactive state, the terminal device records a logged MDT measurement result based on the measurement configuration information. When initiating an RRC connection to the second network device, the terminal device includes indication information in an RRC message, where the indication information indicates that the terminal device records the logged MDT measurement result. The network device may send a request message to the terminal device, where the request message is used to request the logged MDT measurement result. The terminal device reports the logged MDT measurement result to the network device.

It should be understood that the first network device and the second network device may be a same network device or different network devices. For example, because a signal deviates or a satellite flies away, the terminal device may not be capable of sending the measurement result to a network device that sends a measurement configuration. In this case, the terminal device may send the measurement result to a currently newly accessed network device.

When the first network device and the second network device may be the same, and the second network device covers the first cell, or the second network device is configured to forward the signal of the first cell, the second network device determines, based on the measurement result, whether an antenna direction angle corresponding to the first cell or a flight path of the second network device needs to be adjusted.

For example, the measurement result indicates that the terminal device obtains the first cell through measurement. However, based on the information about the time at which the terminal device measures the first cell and the location information of the terminal device, when the antenna direction angle of the first cell is correct and the flight path of the second network device is correct, the terminal device cannot obtain the first cell through measurement. In this case, the second network device determines that the antenna direction angle corresponding to the first cell and/or the flight path of the second network device need/needs to be corrected.

For example, the measurement result indicates that the terminal device does not obtain the first cell through measurement, in other words, the signal quality parameter corresponding to the first cell is less than the first value. However, based on the information about the time at which the terminal device measures the first cell and the location information of the terminal device, when the antenna direction angle of the first cell is correct and the flight path of the second network device is correct, the terminal device can obtain the first cell through measurement. In this case, the second network device determines that the antenna direction angle corresponding to the first cell and/or the flight path of the second network device need/needs to be corrected.

Further, the second network device may determine, based on the signal elevation angle of the first cell, whether the antenna direction angle corresponding to the first cell needs to be adjusted. If determining that the current antenna direction angle is incorrect, the second network device may determine a parameter such as an adjustment amplitude of the antenna direction angle based on the signal elevation angle of the first cell. If determining that the antenna direction angle is correct, the antenna direction angle does not need to be adjusted, and the second network device further checks whether the flight path of the second network device is faulty. For example, the second network device may adjust a speed of a satellite corresponding to the second network device, for example, increase a satellite speed or decrease a satellite speed, or the second network device may alternatively adjust a parameter such as an orbit deviation angle of a satellite corresponding to the second network device. This is not limited in the embodiments.

Step 803: The second network device sends first information to a third network device, where the first information is associated with the measurement result.

The third network device may cover the first cell, or the third network device may be configured to forward the signal of the first cell.

That the third network device covers the first cell may be understood as that the third network device includes the first cell or the first cell is a cell of the third network device.

The first information may include at least one of the measurement result, information that indicates the antenna direction angle corresponding to the first cell, or information that indicates a flight path of the third network device.

For example, the information that indicates the antenna direction angle corresponding to the first cell may include a correct antenna direction angle corresponding to the first cell. In this case, the correct antenna direction angle corresponding to the first cell may be an absolute angle. Alternatively, the information that indicates the antenna direction angle corresponding to the first cell may include a deviation angle of the current antenna direction angle corresponding to the first cell relative to a correct antenna direction angle corresponding to the first cell. In this case, the deviation angle is a relative angle. The third network device may adjust, based on the information that indicates the antenna direction angle corresponding to the first cell, the antenna direction angle corresponding to the first cell. When the third network device completes adjustment of the antenna direction angle corresponding to the first cell, the third network device may send a response message to the second network device. The response message indicates that the third network device has adjusted the antenna direction angle corresponding to the first cell.

For example, the third network device may adjust, based on the measurement result or the information that indicates the flight path of the third network device, the flight path corresponding to the third network device. For example, the third network device may adjust a speed of a satellite corresponding to the third network device, for example, increase a satellite speed or decrease a satellite speed, or adjust a parameter such as an orbit deviation angle of a satellite corresponding to the third network device. When the third network device completes adjustment of the flight path corresponding to the third network device, the third network device may send a response message to the second network device. The response message indicates that the third network device has adjusted the flight path.

In addition, because PCIs of a plurality of cells may be the same, the second network device may send the first information to network devices respectively corresponding to the plurality of cells having the same PCI. When the network device that receives the first information determines that the first information is irrelevant to the network device, the network device may send response information to the second network device, where the response information is used to notify the second network device that the current network device does not need to adjust an antenna direction angle or a flight path.

In some embodiments, when the first network device is different from the second network device, the second network device may further send the measurement result to a core network, and the core network forwards the measurement result to another network device, the core network forwards the measurement result to a network device corresponding to the first cell indicated by the measurement result or a network device configured to forward the signal of the first cell.

Before step 801, the terminal device may send capability information of the terminal device to the network device, where the capability information of the terminal device includes at least one of a cell that the terminal device can measure, a measurement frequency band on which the terminal device can perform measurement, or a signal elevation angle measurement error corresponding to the measurement frequency band on which the terminal device can perform measurement.

For example, capabilities of the terminal device may also be classified into a plurality of levels, for example, a level 1, a level 2, and a level 3. Each level represents a signal elevation angle measurement error or precision corresponding to the measurement frequency band on which the terminal device can perform measurement. A classification standard may be specified in a protocol or may be sent by the first network device to the terminal device.

For example, the capabilities of the terminal device may correspond to different objects. For example, the capabilities of the terminal device for measuring different types of cells are different. The cell herein may be a GEO cell, an LEO cell, a terrestrial cell, or the like.

For example, the capabilities of the terminal device may correspond to different frequency bands. For example, the capabilities of the terminal device for measuring different frequency bands are different. The frequency band herein may be FR1, FR2, or the like.

For example, the capabilities of the terminal device may correspond to different frequency band combinations. For example, the terminal device supports a frequency band 1 and a frequency band 2 or supports a frequency band 1 and a frequency band 3 or supports a frequency band 2 and a frequency band 3, or supports a frequency band 1, a frequency band 2, and a frequency band 3. Each frequency band combination may correspond to one identifier, and the terminal device may report, to the first network device, an identifier corresponding to a frequency band combination supported by the terminal device.

The terminal device may report the capability information of the terminal device to the first network device, and the first network device may configure the measurement configuration information for the terminal device based on the capability information of the terminal device, for example, configure a cell to be measured for the terminal device based on the capability information of the terminal device.

The terminal device reports the measurement result, and the second network device may forward the first information to the third network device. The third network device includes the first cell or forwards the signal of the first cell, so as to adjust the antenna direction angle corresponding to the first cell or adjust the flight path corresponding to the third network device. Therefore, the foregoing method may be used effectively for correcting an error in cell coverage, and the method has low costs, and may be further applied to a scenario in which a self-correction mechanism of a satellite fails.

Figure 9:
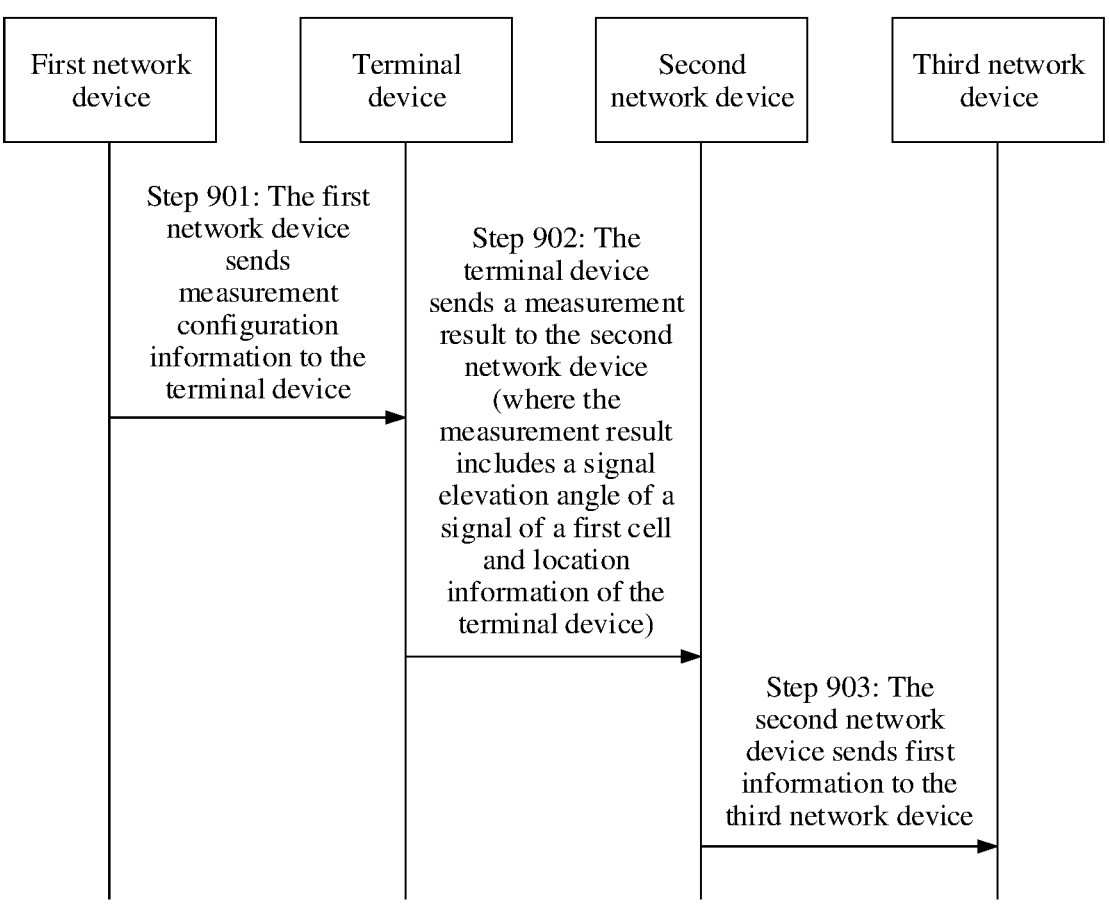
FIG. 9 is an overview flowchart 2 of a communication method according to an embodiment.

As shown in FIG. 9, an embodiment may further provide a communication method, to correct an error in cell coverage. The method includes the following steps.

Step 901: A first network device sends measurement configuration information to a terminal device, where the measurement configuration information indicates the terminal device to report a signal elevation angle corresponding to a signal of a measured first cell and location information of the terminal device.

For step 901, the first network device may include the measurement configuration information in SI or dedicated signaling. For example, the dedicated signaling may be an RRC reconfiguration message or may be other signaling. This is not limited in embodiments.

In some embodiments, the first network device may indicate the terminal device to measure the first cell. The first cell may be a serving cell of the terminal device or a neighboring cell of the serving cell of the terminal device, and the first cell may be a satellite cell. For example, the serving cell of the terminal device may be a satellite cell, or the neighboring cell of the serving cell of the terminal device is a satellite cell.

The measurement configuration information may include an identifier of the first cell. The identifier herein includes, but is not limited to, at least one of a CGI, a PCI, a frequency, a network device identifier, or a satellite type of a cell. For example, the measurement configuration information may include a CGI corresponding to the first cell, a frequency and a PCI corresponding to the first cell, or a frequency, a PCI, and a satellite type corresponding to the first cell.

In addition, the measurement configuration information may further indicate a plurality of cells. In other words, the measurement configuration information may include identifiers of the plurality of cells. This is not limited in the embodiments. For example, the measurement configuration information may carry a measurement object, and the measurement object may include an identifier of at least one cell, for example, an identifier of the serving cell of the terminal device and/or an identifier of the neighboring cell of the serving cell of the terminal device.

It should be understood that the location information of the terminal device may be absolute location information of the terminal device, for example, GPS information of the terminal device. Alternatively, the location information of the terminal device may be relative location information of the terminal device, for example, location information of the terminal device relative to a reference point. The relative location information may include a direction and a distance. For example, the relative location information of the terminal device may be a relative direction and a distance from the terminal device to a cell center. The cell center may be specified in a communication protocol or may be notified to the terminal device via the first network device. For example, location information of the cell center may be sent in the system broadcast or the dedicated signaling.

In addition, the measurement configuration information may further include, but is not limited to, at least one of the following content.

The measurement configuration information further indicates time at which the terminal device measures the first cell, and a measurement result sent by the terminal device may include information about the time at which the terminal device measures the first cell.

The measurement configuration information may indicate a start moment at which the terminal device measures the first cell. The start moment herein may be an absolute value or a relative value. This is not limited in the embodiments. For example, the measurement configuration information indicates a start moment, for example, absolute time, at which the terminal device measures the first cell, or the measurement configuration information indicates N seconds that are between a moment at which the terminal device receives the measurement configuration information and a moment at which the terminal device starts to measure the first cell, where N is a positive integer. It may be understood that the information about the time in the measurement result may also be an absolute value or a relative value of the start moment at which the terminal device starts to measure the first cell.

For example, the measurement configuration information may further indicate the terminal device to periodically measure the first cell or indicate a quantity of times for which the terminal device measures the first cell. For example, the quantity of times herein may be one or more.

The measurement configuration information further indicates a measurement manner used by the terminal device to measure the first cell, and the measurement manner includes MDT or mobility measurement. For example, the MDT herein may be logged MDT or immediate MDT. In addition, the method provided in this embodiment may be further applied to measurement in a self-organization network.

In addition, the measurement configuration information further indicates a trigger condition for measuring the first cell by the terminal device. Correspondingly, if determining that the trigger condition is met, the terminal device measures the first cell based on the measurement configuration information.

In some embodiments, the trigger condition is that the terminal device starts to measure the first cell after receiving the measurement configuration information from the network device. For example, the terminal device immediately measures the first cell after receiving the measurement configuration information from the network device.

In some other embodiments, the trigger condition is that after receiving the measurement configuration information from the network device, the terminal device starts to measure the first cell when determining that a preset condition is met. For example, the measurement configuration information further includes a preset value corresponding to a signal quality parameter. After receiving the measurement configuration information from the network device, the terminal device monitors the signal quality parameter, and starts to measure the first cell when determining that the signal quality parameter of the first cell is less than the preset value. The signal quality parameter may be RSRP, RSRQ, or the like. This is not limited in the embodiments.

It should be understood that the preset value corresponding to the signal quality parameter may be configured by the first network device or may be specified in a communication protocol. When the preset value corresponding to the signal quality parameter is configured by the first network device, the preset value corresponding to the signal quality parameter may be carried in the measurement configuration information or may be carried by using other signaling. This is not limited in the embodiments.

It should be understood that content included in the foregoing measurement configuration information is merely an example and is not intended to limit the embodiments.

Step 902: The terminal device sends the measurement result to a second network device, where the measurement result includes the signal elevation angle of the first cell and the location information of the terminal device.

The measurement result is obtained by the terminal device by measuring the first cell based on the measurement configuration information.

For step 902, the measurement result may be sent as one piece of information or may be separately sent as a plurality of pieces of information. For example, the signal elevation angle of the first cell is sent as one piece of information, and the location information of the terminal device and the information about the time at which the terminal device measures the first cell are sent as another piece of information. Alternatively, information that indicates that the terminal device obtains the signal of the first cell through measurement, the signal elevation angle of the first cell, the location information of the terminal device, and the information about the time at which the terminal device measures the first cell are sent as one piece of information.

In an example, the terminal device may actively send the measurement result to the second network device. For example, when the terminal device is in a connected state, the terminal device may immediately send the measurement result to the second network device after completing measurement for the first cell.

In another example, the terminal device sends notification information to the second network device, where the notification information is used to notify the second network device that the terminal device stores the measurement result, or the notification information is used to query whether the second network device needs the terminal device to report the measurement result. After the second network device receives the notification information from the terminal device, the second network device sends a request message to the terminal device, where the request message is used to request the terminal device to send the measurement result to the second network device. For example, if the terminal device is configured to perform the logged MDT, when the terminal device enters an idle state or an inactive state, the terminal device records a logged MDT measurement result based on the measurement configuration information. When initiating an RRC connection to the second network device, the terminal device includes indication information in an RRC message, where the indication information indicates that the terminal device records the logged MDT measurement result. The network device may send a request message to the terminal device, where the request message is used to request the logged MDT measurement result. The terminal device reports the logged MDT measurement result to the network device.

It should be understood that the first network device and the second network device may be a same network device or different network devices. For example, because a signal deviates or a satellite flies away, the terminal device may not be capable of sending the measurement result to a network device that sends a measurement configuration. In this case, the terminal device may send the measurement result to a currently newly accessed network device.

When the first network device and the second network device may be the same, and the second network device covers the first cell, or the second network device is configured to forward the signal of the first cell, the second network device determines, based on the measurement result, whether an antenna direction angle corresponding to the first cell or a flight path of the second network device needs to be adjusted.

The second network device may determine, based on the signal elevation angle of the first cell, whether the antenna direction angle corresponding to the first cell needs to be adjusted. If determining that the current antenna direction angle is incorrect, the second network device may determine a parameter such as an adjustment amplitude of the antenna direction angle based on the signal elevation angle of the first cell. If determining that the antenna direction angle is correct, the antenna direction angle does not need to be adjusted, and the second network device further checks whether the flight path of the second network device is faulty. For example, the second network device may adjust a speed of a satellite corresponding to the second network device, for example, increase a satellite speed or decrease a satellite speed, or the second network device may alternatively adjust a parameter such as an orbit deviation angle of a satellite corresponding to the second network device. This is not limited in the embodiments.

Step 903: The second network device sends first information to a third network device, where the first information is associated with the measurement result.

The third network device may cover the first cell, or the third network device may be configured to forward the signal of the first cell.

That the third network device covers the first cell may be understood as that the third network device includes the first cell or the first cell is a cell of the third network device.

The first information may include at least one of the measurement result, information that indicates the antenna direction angle corresponding to the first cell, or information that indicates a flight path of the third network device.

For example, the information that indicates the antenna direction angle corresponding to the first cell may include a correct antenna direction angle corresponding to the first cell. In this case, the correct antenna direction angle corresponding to the first cell may be an absolute angle. Alternatively, the information that indicates the antenna direction angle corresponding to the first cell may include a deviation angle of the current antenna direction angle corresponding to the first cell relative to a correct antenna direction angle corresponding to the first cell. In this case, the deviation angle is a relative angle. The third network device may adjust, based on the information that indicates the antenna direction angle corresponding to the first cell, the antenna direction angle corresponding to the first cell. When the third network device completes adjustment of the antenna direction angle corresponding to the first cell, the third network device may send a response message to the second network device. The response message indicates that the third network device has adjusted the antenna direction angle corresponding to the first cell.

For example, the third network device may adjust, based on the measurement result or the information that indicates the flight path of the third network device, the flight path corresponding to the third network device. For example, the third network device may adjust a speed of a satellite corresponding to the third network device, for example, increase a satellite speed or decrease a satellite speed, or adjust a parameter such as an orbit deviation angle of a satellite corresponding to the third network device. When the third network device completes adjustment of the flight path corresponding to the third network device, the third network device may send a response message to the second network device. The response message indicates that the third network device has adjusted the flight path.

In addition, because PCIs of a plurality of cells may be the same, the second network device may send the first information to network devices respectively corresponding to the plurality of cells having the same PCI. When the network device that receives the first information determines that the first information is irrelevant to the network device, the network device may send response information to the second network device, where the response information is used to notify the second network device that the current network device does not need to adjust an antenna direction angle or a flight path.

In some embodiments, when the first network device is different from the second network device, the second network device may further send the measurement result to a core network, and the core network forwards the measurement result to another network device, the core network forwards the measurement result to a network device corresponding to the first cell indicated by the measurement result or a network device configured to forward the signal of the first cell.

Before step 901, the terminal device may send capability information of the terminal device to the network device, where the capability information of the terminal device includes at least one of a cell that the terminal device can measure, a measurement frequency band on which the terminal device can perform measurement, or a signal elevation angle measurement error corresponding to the measurement frequency band on which the terminal device can perform measurement.

For example, capabilities of the terminal device may also be classified into a plurality of levels, for example, a level 1, a level 2, and a level 3. Each level represents a signal elevation angle measurement error or precision corresponding to the measurement frequency band on which the terminal device can perform measurement. A classification standard may be specified in a protocol or may be sent by the first network device to the terminal device.

For example, the capabilities of the terminal device may correspond to different objects. For example, the capabilities of the terminal device for measuring different types of cells are different. The cell herein may be a GEO cell, an LEO cell, a terrestrial cell, or the like.

For example, the capabilities of the terminal device may correspond to different frequency bands. For example, the capabilities of the terminal device for measuring different frequency bands are different. The frequency band herein may be FR1, FR2, or the like.

For example, the capabilities of the terminal device may correspond to different frequency band combinations. For example, the terminal device supports a frequency band 1 and a frequency band 2 or supports a frequency band 1 and a frequency band 3 or supports a frequency band 2 and a frequency band 3, or supports a frequency band 1, a frequency band 2, and a frequency band 3. Each frequency band combination may correspond to one identifier, and the terminal device may report, to the first network device, an identifier corresponding to a frequency band combination supported by the terminal device.

The terminal device may report the capability information of the terminal device to the first network device, and the first network device may configure the measurement configuration information for the terminal device based on the capability information of the terminal device, for example, configure a cell to be measured for the terminal device based on the capability information of the terminal device.

The terminal device reports the measurement result, and the second network device may forward the first information to the third network device. The third network device includes the first cell or forwards the signal of the first cell, so as to adjust the antenna direction angle corresponding to the first cell or adjust the flight path corresponding to the third network device. Therefore, the foregoing method may be used effectively for correcting a problem of cell coverage, and the method has low costs, and may be further applied to a scenario in which a self-correction mechanism of a satellite fails.

In the foregoing embodiments, various solutions of the communication method provided in the embodiments are separately described from perspectives of each network element and interaction between network elements. It may be understood that, to implement the foregoing functions, each network element such as the network device or the terminal device includes a corresponding hardware structure and/or software module for performing each function. A person skilled in the art should easily be aware that, in combination with units and algorithm steps of the examples described in embodiments, the embodiments may be implemented by hardware or a combination of hardware and computer software. Whether a function is performed by hardware or hardware driven by computer software depends on particular applications and constraints. A person skilled in the art may use different methods to implement the described functions for each particular application, but it should not be considered that the implementation goes beyond the scope of the embodiments.

Figure 10:
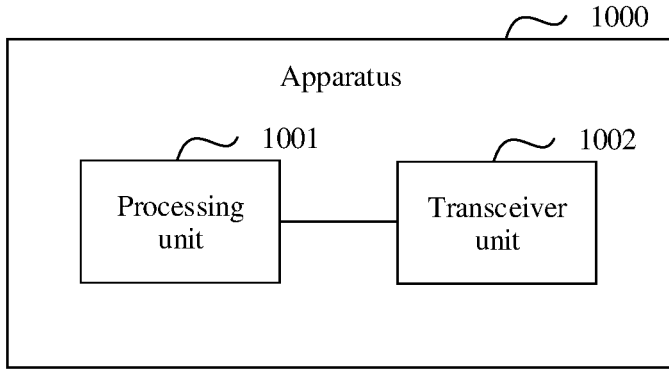
FIG. 10 is a schematic diagram 1 of a structure of an apparatus according to an embodiment.

The same as the foregoing concept, as shown in FIG. 10, an embodiment may further provide an apparatus 1000. The apparatus 1000 includes a transceiver unit 1002 and a processing unit 1001.

In an example, the apparatus 1000 is configured to implement functions of the terminal device in the foregoing methods. Alternatively, the apparatus may be a chip system in a terminal device.

The processing unit 1001 invokes the transceiver unit 1002 to:

receive measurement configuration information from a first network device, where the measurement configuration information indicates the terminal device to measure a first cell; and send a measurement result to a second network device, where the measurement result is obtained by the terminal device by measuring the first cell based on the measurement configuration information, and the measurement result indicates that the terminal device obtains a signal of the first cell through measurement or does not obtain a signal of the first cell through measurement.

In an example, the apparatus 1000 is configured to implement functions of the first network device in the foregoing methods.

The processing unit 1001 is configured to determine measurement configuration information, where the measurement configuration information indicates a terminal device to measure a first cell and report that the terminal device obtains a signal of the first cell through measurement or the terminal device does not obtain a signal of the first cell through measurement.

The transceiver unit 1002 sends the measurement configuration information to the terminal device.

In an example, the apparatus 1000 is configured to implement functions of the second network device in the foregoing methods.

The processing unit 1001 invokes the transceiver unit 1002 to: receive a measurement result from a terminal device, where the measurement result indicates that the terminal device obtains a signal of a first cell through measurement or does not obtain a signal of a first cell through measurement; and send first information to a third network device, where the first information is associated with the measurement result, and the third network device includes the first cell, or the third network device forwards the signal of the first cell.

For execution processes of the processing unit 1001 and the transceiver unit 1002, refer to the descriptions in the foregoing method embodiments. Division into the modules in the embodiments is an example, is merely division into logical functions, and may be other division during actual implementation. In addition, functional modules in the embodiments may be integrated into one processor, or each of the modules may exist alone physically, or two or more modules may be integrated into one module. The integrated module may be implemented in a form of hardware or may be implemented in a form of a software functional module.

In another optional variation, the apparatus may be a chip system. In this embodiment, the chip system may include a chip, or may include a chip and another discrete component. For example, the apparatus includes a processor and an interface circuit. The interface circuit is configured to receive code instructions and transmit the code instructions to the processor. The processor runs the code instructions, to perform the methods according to any one of the foregoing embodiments. The processor implements functions of the processing unit 1001, and the interface circuit implements functions of the transceiver unit 1002.

Figure 11:
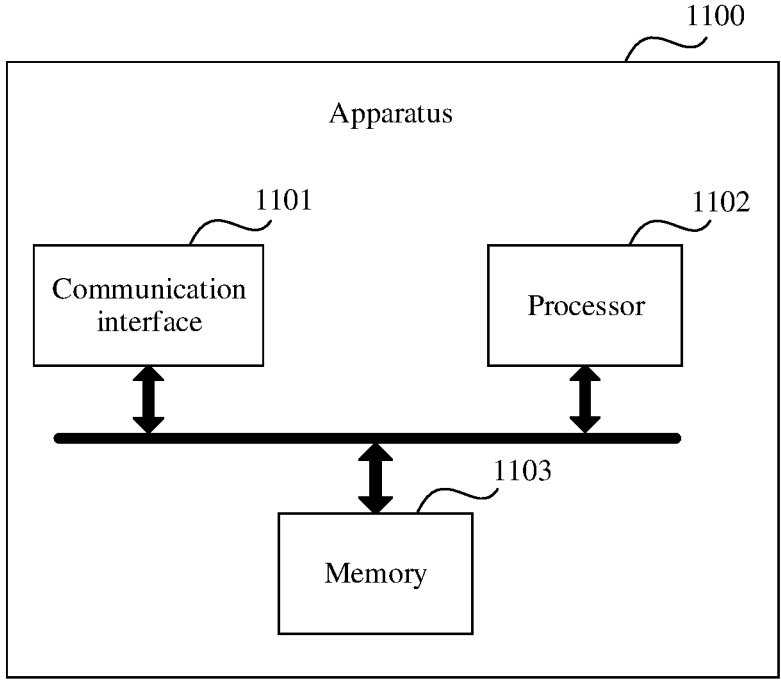
FIG. 11 is a schematic diagram 2 of a structure of an apparatus according to an embodiment.

The same as the foregoing concept, as shown in FIG. 11, an embodiment may further provide an apparatus 1100. The apparatus 1100 includes a communication interface 1101, at least one processor 1102, and at least one memory 1103. The communication interface 1101 is configured to communicate with another device via a transmission medium, so that an apparatus in the apparatus 1100 can communicate with the another device. The memory 1103 is configured to store a computer program. The processor 1102 invokes the computer program stored in the memory 1103 and sends and receives data over the communication interface 1101, to implement the methods in the foregoing embodiments.

For example, when the apparatus is a terminal device, the memory 1103 is configured to store a computer program. The processor 1102 invokes the computer program stored in the memory 1103, and performs, over the communication interface 1101, the methods performed by the terminal device in the foregoing embodiments.

For example, when the apparatus is a first network device, the memory 1103 is configured to store a computer program. The processor 1102 invokes the computer program stored in the memory 1103, and performs, over the communication interface 1101, the methods performed by the first network device in the foregoing embodiments.

For example, when the apparatus is a second network device, the memory 1103 is configured to store a computer program. The processor 1102 invokes the computer program stored in the memory 1103, and performs, over the communication interface 1101, the methods performed by the second network device in the foregoing embodiments.

In this embodiment, the communication interface 1101 may be a transceiver, a circuit, a bus, a module, or a communication interface of another type. The processor 1102 may be a general-purpose processor, a digital signal processor, an application-specific integrated circuit, a field programmable gate array or another programmable logic device, a discrete gate or a transistor logic device, or a discrete hardware component, and may implement or perform the methods, steps, and logical block diagrams in embodiments. The general-purpose processor may be a microprocessor or any conventional processor or the like. The steps of the methods with reference to embodiments may be directly performed by a hardware processor or may be performed by using a combination of hardware in the processor and a software module. The memory 1103 may be a nonvolatile memory, for example, a hard disk drive (HDD) or a solid-state drive (SSD), or may be a volatile memory, for example, a random access memory (RAM). The memory is any other medium that can carry or store expected program code in a form of an instruction or a data structure and that can be accessed by a computer, but is not limited thereto. The memory in this embodiment may alternatively be a circuit or any other apparatus that can implement a storage function. The memory 1103 is coupled to the processor 1102. Coupling in this embodiment is indirect coupling or a communication connection between apparatuses, units, or modules, may be in an electrical form, a mechanical form, or another form, and is used for information exchange between apparatuses, units, or modules. In another implementation, the memory 1103 may alternatively be located outside the apparatus 1100. The processor 1102 may operate cooperatively with the memory 1103. The processor 1102 may execute program instructions stored in the memory 1103. At least one of the at least one memory 1103 may alternatively be included in the processor 1102. In this embodiment, a connection medium between the communication interface 1101, the processor 1102, and the memory 1103 is not limited. For example, in this embodiment, the memory 1103, the processor 1102, and the communication interface 1101 may be connected through a bus in FIG. 11. The bus may be classified into an address bus, a data bus, a control bus, or the like.

It may be understood that the apparatus in the embodiment shown in FIG. 10 may be implemented by the apparatus 1100 shown in FIG. 11. The processing unit 1001 may be implemented by the processor 1102, and the transceiver unit 1002 may be implemented by the communication interface 1101.

An embodiment may further provide a non-transitory computer-readable storage medium. The non-transitory computer-readable storage medium stores a computer program. When the computer program is run on a computer, the computer is enabled to perform the method according to any one of the foregoing embodiments.

A person skilled in the art should understand that the embodiments may be provided as a method, a system, or a computer program product. Therefore, the embodiments may use a form of hardware only embodiments, software only embodiments, or embodiments with a combination of software and hardware. Moreover, the embodiments may use a form of a computer program product that is implemented on one or more computer-usable storage media (including, but not limited to, a disk memory, a CD-ROM, an optical memory, and the like) that include computer-usable program code.

The embodiments may be described with reference to the flowcharts and/or block diagrams of the methods, the devices (systems), and the computer program product according to the embodiments. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by the computer or the processor of any other programmable data processing device generate an apparatus for implementing a function in one or more processes in the flowcharts and/or in one or more blocks in the block diagrams.

These computer program instructions may be stored in a computer-readable memory that can instruct the computer or any other programmable data processing device to work in a manner, so that the instructions stored in the computer-readable memory generate an artifact that includes an instruction apparatus. The instruction apparatus implements a function in one or more processes in the flowcharts and/or in one or more blocks in the block diagrams.

The computer program instructions may alternatively be loaded onto a computer or another programmable data processing device, so that a series of operations and steps are performed on the computer or the another programmable device, so that computer-implemented processing is generated. Therefore, the instructions executed on the computer or the another programmable device provide steps for implementing a function in one or more procedures in the flowcharts and/or in one or more blocks in the block diagrams.

A person skilled in the art can make various modifications and variations to the embodiments without departing from the scope of the embodiments. Modifications and variations in the embodiments are covered provided that they fall within the scope of the embodiments and their equivalent technologies.

What is claimed is:

1. A communication method comprising:
receiving measurement configuration information from a first network device, wherein the measurement configuration information indicates a terminal device to measure a first cell;

sending a measurement result to a second network device, wherein the measurement result is obtained by the terminal device by measuring the first cell based on the measurement configuration information, and the measurement result indicates that the terminal device obtains a signal of the first cell through measurement or does not obtain a signal of the first cell through measurement;
wherein the method further comprises:
sending capability information of the terminal device to the first network device;
wherein capabilities of the terminal device are classified into a plurality of levels, each level of the plurality of levels represents a signal elevation angle measurement error or a precision corresponding to a measurement frequency band on which the terminal device is configured to perform the measurement, and measurement configuration information for the terminal device is configured based on the capability information of the terminal device.

2. The communication method according to claim 1, wherein the measurement configuration information further indicates the terminal device to report a signal elevation angle of the first cell, and the measurement result further comprises the signal elevation angle of the first cell.

3. The communication method according to claim 1, wherein the measurement configuration information further indicates the terminal device to report location information of the terminal device, and the measurement result further comprises the location information of the terminal device.

4. The communication method according to claim 1, wherein the measurement configuration information further indicates time at which the terminal device measures the first cell, and the measurement result further comprises information about the time at which the terminal device measures the first cell.

5. The communication method according to claim 1, wherein the capability information of the terminal device comprises at least one of a cell that the terminal device can measure, a measurement frequency band on which the terminal device can perform measurement, or a signal elevation angle measurement error corresponding to the measurement frequency band on which the terminal device can perform measurement.

6. The communication method according to claim 1, wherein the first cell is a serving cell of the terminal device or a neighboring cell of the serving cell of the terminal device.

7. The communication method according to claim 1, wherein the first cell is a satellite cell.

8. The communication method according to claim 1, wherein the measurement configuration information comprises an identifier of the first cell, and the identifier comprises at least one of a cell global identifier (CGI), a physical cell identifier (PCI), a frequency, a network device identifier, or a satellite type of a cell.

9. A communication method comprising:
determining measurement configuration information, wherein the measurement configuration information indicates a terminal device to measure a first cell and report that the terminal device obtains a signal of the first cell through measurement or the terminal device does not obtain a signal of the first cell through measurement;
sending the measurement configuration information to the terminal device; and wherein the method further comprises:

receiving capability information of the terminal device;

wherein capabilities of the terminal device are classified into a plurality of levels, each level of the plurality of levels represents a signal elevation angle measurement error or a precision corresponding to a measurement frequency band on which the terminal device is configured to perform the measurement, and measurement configuration information for the terminal device is configured based on the capability information of the terminal device.

10. The communication method according to claim 9, wherein the measurement configuration information further indicates at least one of the following: the terminal device to report a signal elevation angle of the first cell, the terminal device to report location information of the terminal device, or time at which the terminal device measures the first cell.

11. The communication method according to claim 9, wherein the capability information of the terminal device comprises at least one of a cell that the terminal device can measure, a measurement frequency band on which the terminal device can perform measurement, or a signal elevation angle measurement error corresponding to the measurement frequency band on which the terminal device can perform measurement.

12. The communication method according to claim 9, wherein the first cell is a serving cell of the terminal device or a neighboring cell of the serving cell of the terminal device.

13. The communication method according to claim 9, wherein the first cell is a satellite cell.

14. The communication method according to claim 9, wherein the measurement configuration information comprises an identifier of the first cell, and the identifier comprises at least one of a cell global identifier (CGI), a physical cell identifier (PCI), a frequency, a network device identifier, or a satellite type of a cell.

15. A communication apparatus comprising:

circuitry comprising one or more processors; and a memory coupled to the circuitry and configured to store software that, when executed by the circuitry, configures the circuitry to:

receive measurement configuration information from a first network device, wherein the measurement configuration information indicates a terminal device to measure a first cell;

send a measurement result to a second network device, wherein the measurement result is obtained by the terminal device by measuring the first cell based on the measurement configuration information, and the measurement result indicates that the terminal device either obtains a signal of the first cell through measurement or does not obtain a signal of the first cell through measurement; and send capability information of the terminal device to the first network device;

wherein capabilities of the terminal device classified into a plurality of levels, wherein each level of the plurality of levels represents a signal elevation angle measurement error or a precision corresponding to a measurement frequency band on which the terminal device is configured to perform the measurement, and measurement configuration information for the terminal device is configured based on the capability information of the terminal device.

16. The communication apparatus according to claim 15, wherein the measurement configuration information further indicates the terminal device to report a signal elevation angle of the first cell, and the measurement result further comprises the signal elevation angle of the first cell.

17. The communication apparatus according to claim 15, wherein the measurement configuration information further indicates the terminal device to report location information of the terminal device, and the measurement result further comprises the location information of the terminal device.

18. The communication apparatus according to claim 15, wherein the measurement configuration information further indicates time at which the terminal device measures the first cell, and the measurement result further comprises information about the time at which the terminal device measures the first cell.

19. The communication apparatus according to claim 15, wherein the capability information of the terminal device comprises at least one of:

a cell that the terminal device can measure, a measurement frequency band on which the terminal device can perform measurement, or a signal elevation angle measurement error corresponding to the measurement frequency band on which the terminal device can perform measurement.

20. The communication apparatus according to claim 15, wherein the first cell is a satellite cell.

* * * * *